United States Patent
Druitt et al.

(10) Patent No.: US 7,149,349 B2
(45) Date of Patent: Dec. 12, 2006

(54) SCANNING AND DETECTING A NUMBER OF IMAGES

(75) Inventors: Colin Eric Druitt, North Rocks (AU); Matthew William Gallagher, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 10/252,522

(22) Filed: Sep. 24, 2002

(65) Prior Publication Data
US 2003/0059111 A1    Mar. 27, 2003

(30) Foreign Application Priority Data
Sep. 24, 2001 (AU) .................................. PR7881

(51) Int. Cl.
*G06K 9/00* (2006.01)
(52) U.S. Cl. ...................... 382/165; 382/171; 382/173; 382/190; 382/199; 358/474; 358/518
(58) Field of Classification Search ................ 382/162, 382/165, 167, 170, 173, 199, 190; 358/518–523, 358/488, 474
See application file for complete search history.

(56) References Cited

U.S. PATENT DOCUMENTS

| | | | |
|---|---|---|---|
| 4,673,988 A | 6/1987 | Jansson et al. ............. 358/280 |
| 4,888,648 A | 12/1989 | Takeuchi et al. ............ 358/355 |
| 4,992,953 A | 2/1991 | Yoshida et al. ............. 364/512 |
| 5,197,120 A | 3/1993 | Saxton et al. ............... 395/139 |
| 5,214,755 A | 5/1993 | Mason ........................ 395/147 |
| 5,274,751 A | 12/1993 | Rosenberg .................. 395/117 |
| 5,357,603 A | 10/1994 | Parker ........................ 395/156 |
| 5,375,197 A | 12/1994 | Kang .......................... 395/147 |
| 5,396,590 A | 3/1995 | Kreegar ...................... 395/159 |
| 5,426,729 A | 6/1995 | Parker ........................ 395/155 |
| 5,448,688 A | 9/1995 | Hemingway ................ 395/141 |
| 5,450,536 A | 9/1995 | Rosenberg et al. ......... 395/148 |
| 5,450,539 A | 9/1995 | Ruben ........................ 395/155 |
| 5,513,309 A | 4/1996 | Meier et al. ................ 395/155 |
| 5,515,496 A | 5/1996 | Kaehler et al. ............. 395/159 |
| 5,535,320 A | 7/1996 | Gay et al. ................... 395/150 |
| 5,553,217 A | 9/1996 | Hart et al. .................. 395/148 |
| 5,561,753 A | 10/1996 | Coulombe et al. .......... 395/155 |
| 5,563,722 A | 10/1996 | Norris ........................ 358/453 |
| 5,570,462 A | 10/1996 | McFarland .................. 395/136 |
| 5,590,276 A | 12/1996 | Andrews ............... 395/182.04 |
| 5,602,974 A | 2/1997 | Shaw et al. ................. 395/114 |
| 5,611,060 A | 3/1997 | Belfiore et al. ............. 395/341 |
| 5,648,908 A | 7/1997 | Chirn et al. ........... 364/470.06 |
| 5,649,216 A | 7/1997 | Sieber ........................ 395/767 |
| 5,651,107 A | 7/1997 | Frank et al. ................ 395/344 |
| 5,652,901 A | 7/1997 | Slayden et al. ............. 395/789 |

(Continued)

*Primary Examiner*—Jingge Wu
*Assistant Examiner*—Ali Bayat
(74) *Attorney, Agent, or Firm*—Fitzpatrick, Cella, Harper & Scinto

(57) ABSTRACT

The disclosed a number of methods for scanning and individually detecting a number of images on a scanner platen. In one method, the scanner scans the platen one scanline after another and performs the following steps for each scanline. The method first detects and groups together one or more consecutive pixels of a current scanline having substantially similar colors (804,808,806). The method then determines (826) those said groups of pixels of a current scanline which likely belong to images and those which likely belong to background of the scanner. The method then copies (708) the determined groups of pixels belonging to images of a current scanline to their respective images.

23 Claims, 15 Drawing Sheets

U.S. PATENT DOCUMENTS

| | | | |
|---|---|---|---|
| 5,664,133 A | 9/1997 | Malamud et al. | 345/352 |
| 5,680,629 A | 10/1997 | Slayden et al. | 395/789 |
| 5,687,331 A | 11/1997 | Volk et al. | 395/327 |
| 5,692,144 A | 11/1997 | Thrush | 395/339 |
| 5,706,368 A | 1/1998 | Mita | 382/284 |
| 5,721,851 A | 2/1998 | Cline et al. | 395/349 |
| 5,721,853 A | 2/1998 | Smith | 395/353 |
| 5,740,389 A | 4/1998 | Li et al. | 395/346 |
| 5,751,590 A | 5/1998 | Cannon et al. | 364/479.03 |
| 5,757,358 A | 5/1998 | Osga | 345/146 |
| 5,760,772 A | 6/1998 | Austin | 345/342 |
| 5,760,773 A | 6/1998 | Berman et al. | 345/347 |
| 5,801,692 A | 9/1998 | Muzio et al. | 345/339 |
| 5,805,163 A | 9/1998 | Bagnas | 345/345 |
| 5,815,151 A | 9/1998 | Argiolas | 345/342 |
| 5,825,368 A | 10/1998 | Wilks | 345/440 |
| 5,837,317 A | 11/1998 | Moriwaki et al. | 427/217 |
| 5,844,566 A | 12/1998 | Lecland et al. | 345/426 |
| 5,844,797 A | 12/1998 | Johnson | 364/400 |
| 5,860,073 A | 1/1999 | Ferrel et al. | 707/522 |
| 5,867,144 A | 2/1999 | Wyard | 345/146 |
| 5,870,711 A | 2/1999 | Huffman | 705/8 |
| 5,956,468 A | 9/1999 | Ancin | 395/109 |
| 5,974,199 A | 10/1999 | Lee et al. | 382/289 |
| 6,791,723 B1 * | 9/2004 | Vallmajo et al. | 358/488 |
| 2002/0146173 A1 * | 10/2002 | Herley | 382/199 |
| 2005/0163382 A1 * | 7/2005 | Herley | 382/199 |

* cited by examiner

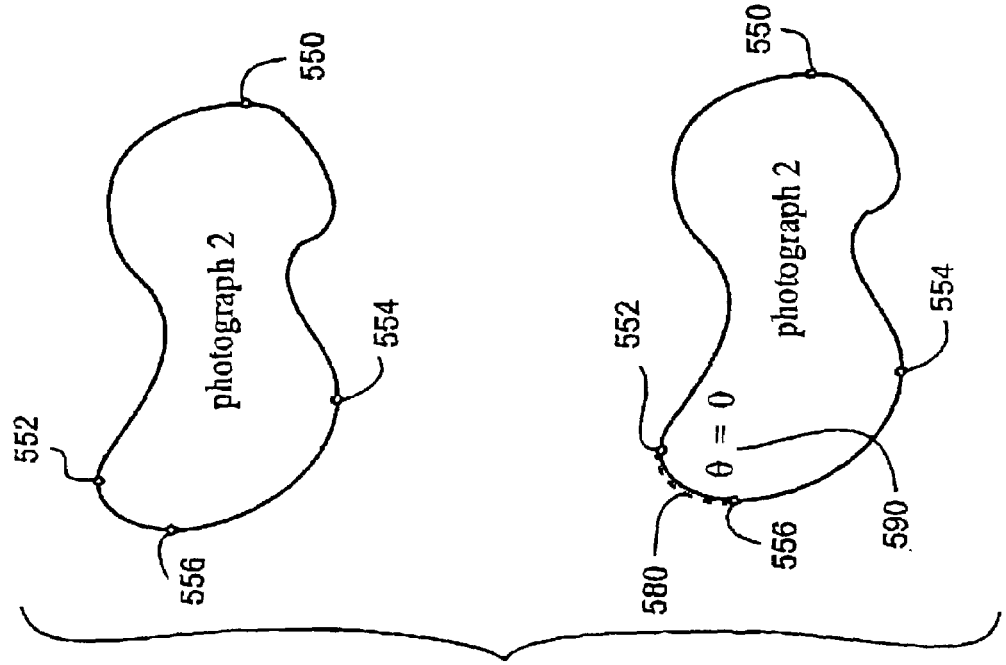
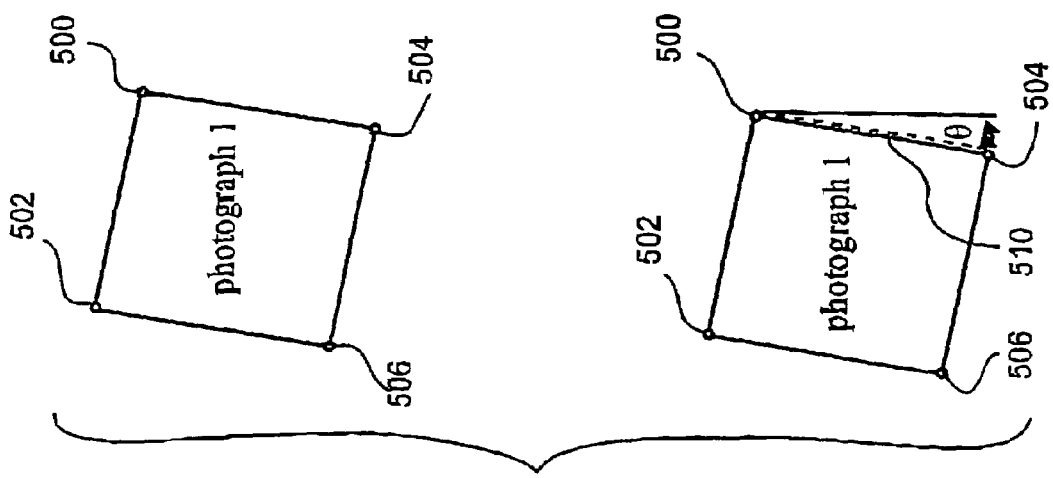
Fig. 6
Fig. 5

SCANNING AND DETECTING A NUMBER OF IMAGES

TECHNICAL FIELD

The present invention relates generally to scanning and individually detecting a number of images on a scanning platen.

BACKGROUND

The publication U.S. Pat. No. 5,974,199 describes a method for scanning and detecting a plurality of photographs on a scanner. The method detects the number and skew angle of the photographs and removes edge artifacts. The method first conducts a low-resolution scan of the photographs on the scanner platen to produce an image of the plurality of photographs. The method then constructs a plurality of polygons, where each polygon contains at least one photograph. A number of polygons is then determined and compared to the number of photographs, the latter number being supplied by the user. If the number of constructed polygons is less than the number of photographs, the user is informed to re-position the photographs in order to separate overlapped photographs and the low resolution scan is repeated. The method then deters a skew angle and location for each one of the photographs from the determined polygons. The result of the photograph detection is displayed on a touch screen and the user selects a photograph of interest by touching the screen. The method then scans the selected photograph at high resolution to produce a high-resolution image. The high-resolution image is then de-skewed and cropped to remove the edge artifacts.

The method of U.S. Pat. No. 5,974,199 suffers from the disadvantage that it requires large memory requirements for processing the photographs. It also suffers from the disadvantage that it is a two pass process, in that it initially requires a low resolution scan of the photographs an finally a high resolution scan of the selected photograph.

SUMMARY

It is an object of the present invention to substantially overcome, or at least ameliorate, one or more disadvantages of existing arrangements.

According to one aspect of the invention, there is provided a method of scanning and individually detecting a number of images on a scanner, the method performing the following steps for a plurality of scanlines: detecting and grouping together one or more consecutive pixels of a current scanline, wherein the pixels are grouped together based on a representation of said current scanline; determining a current background colour of the scanner, wherein the current background colour is derived from a previously said determined background colour and a colour representative of that group of pixels of the current scanline most likely to be part of the background, determining those said groups of pixels of a current scanline that are likely to belong to said images and those that are likely to belong to the background based upon said determined current background colour; and copying said determined groups of pixels belonging to images of a current scanline to their respective images.

According to another aspect of the invention, there is provided a method of scanning and individually detecting a number of images on a scanner, the method performing the following steps for a plurality of scanlines: detecting and grouping together one or more consecutive pixels of a current scanline having substantially similar colours; determining a current background colour having a likelihood of being a background colour of the scanner, wherein the current background colour is derived from a previously said determined background colour and a colour representative of that group of pixels of the current scanline most likely to be part of the background colour; determining those said groups of pixels of a current scanline that are likely to belong to said images and those that are likely to belong to the background based upon said determined current background colour; and copying said determined groups of pixels belonging to images of a current scanline to their respective images.

According to another aspect of the invention, there is provided a method of scanning and individually detecting a number of images on a scanner, the method performing the following steps for a plurality of scanlines: pre-processing a current scanline to provide a current pre-processed scanline, wherein the current pre-processed scanline is representative of edges of a pixel image of the current scanline; detecting and grouping together one or more consecutive pixels of the current pre-processed scanline, wherein those pixels of the current pre-processed scanline having values below a predetermined threshold value are grouped together in a group; determining a current background colour having a likelihood of being a background colour of the scanner, wherein the current background colour is derived from a previously said determined background colour and a colour representative of a group of pixels of the current scanline corresponding to the said group of pixels of the current pre-processed scanline having values below the predetermined threshold; determining those groups of pixels of a current scanline that are likely to belong to said images and those that are likely to belong to the background based upon said determined current background colour; and copying said determined groups of pixels belonging to images of a current scanline to their respective images.

According to another aspect of the invention, there is provided apparatus for scanning and individually detecting a number of images on a scanner, the apparatus comprising: processing means for processing a plurality of scanlines, the processing means comprising: means for detecting and grouping together one or more consecutive pixels of a current scanline, wherein the pixels are grouped together based on a representation of said current scanline; means for determining a current background colour of the scanner, wherein the current background colour is derived from a previously said determined background colour and a colour representative of that group of pixels of the current scanline most likely to be part of the background; means for determining those said groups of pixels of a current scanline that are likely to belong to said images and those that are likely to belong to the background based upon said determined current background colour; and means for copying said determined groups of pixels belonging to images of a current scanline to their respective images.

According to another aspect of the invention, there is provided apparatus for scanning and individually detecting a number of images on a scanner, the apparatus comprising: processing means for processing a plurality of scanlines, the processing means comprising: means for detecting and grouping together one or more consecutive pixels of a current scanline having substantially similar colours; means for determining a current background colour having a likelihood of being a background colour of the scanner, wherein the current background colour is derived from a previously said determined background colour and a colour representative of that group of pixels of the current scanline most likely to be part of the background colour; means for determining those said groups of pixels of a current scanline that are likely to belong to said images and those that are likely to belong to the background based upon said determined current background colour; and means for copying said determined groups of pixels belonging to images of a current scanline to their respective images.

According to another aspect of the invention, there is provided apparatus for scanning and individually detecting a number of images on a scanner, the apparatus comprising: processing means for processing a plurality of scanlines, the processing means comprising: means for pre-processing a current scanline to provide a current pre-processed scanline, wherein the current pre-processed scanline is representative of edges of a pixel image of the current scanline; means for detecting and grouping together one or more consecutive pixels of the current pre-processed scanline, wherein those pixels of the current pre-processed scanline having values below a predetermined threshold value are grouped together in a group; means for determining a current background colour having a likelihood of being a background colour of the scanner, wherein the current background colour is derived from a previously said determined background colour and a colour representative of a group of pixels of the current scanline corresponding to the said group of pixels of the current pre-processed scanline having values below the predetermined threshold; means for determining those said groups of pixels of a current scanline that are likely to belong to said images and those that are likely to belong to the background based upon said determined current background colour; and means for copying said determined groups of pixels belonging to images of a current scanline to their respective images.

According to another aspect of the invention, there is provided a computer program for scanning and individually detecting a number of images on a scanner, the computer program comprising: processing means for processing a plurality of scanlines, the processing means comprising: means for detecting and grouping together one or more consecutive pixels of a current scanline, wherein the pixels are grouped together based on a representation of said current scanline; means for determining a current background colour of the scanner, wherein the current background colour is derived from a previously said determined background colour and a colour representative of that group of pixels of the current scanline most likely to be part of the background; means for determining those sad groups of pixels of a current scanline that are likely to belong to said images and those that are likely to belong to the background based upon said determined current background colour; and means for copying said determined groups of pixels belonging to images of a current scanline to their respective images.

According to another aspect of the invention, there is provided a computer program for scanning and individually detecting a number of images on a scanner, the computer program comprising: processing means for processing a plurality of scanlines, the processing means comprising: means for detecting and grouping together one or more consecutive pixels of a current scanline having substantially similar colours; means for determining a current background colour having a likelihood of being a background colour of the scanner, wherein the current background colour is derived from a previously said determined background colour and a colour representative of that group of pixels of the current scanline most likely to be part of the background colour; means for determining those said groups of pixels of a current scanline that are likely to belong to said images and those that are likely to belong to the background based upon said determined current background colour; and means for copying said determined groups of pixels belonging to images of a current scanline to their respective images.

According to another aspect of the invention, there is provided a computer program for scanning and individually detecting a number of images on a scanner, the computer program comprising: processing means for processing a plurality of scanlines, the processing means comprising: means for pre-processing a current scanline to provide a current pre-processed scanline, wherein the current pre-processed scanline is representative of edges of a pixel image of the current scanline; means for detecting and grouping together one or more consecutive pixels of the current pre-processed scanline, wherein those pixels of the current pre-processed scanline having values below a predetermined threshold value are grouped together in a group; means for determining a current background colour having a likelihood of being a background colour of the scanner, wherein the current background colour is derived from a previously said determined background colour and a colour representative of a group of pixels of the current scanline corresponding to the said group of pixels of the current pre-processed scanline having values below the predetermined threshold; means for determining those said groups of pixels of a current scanline that are likely to belong to said images and those that are likely to belong to the background based upon said determined current background colour; and means for copying said determined groups of pixels belonging to images of a current scanline to their respective images.

Other aspects of the invention are also disclosed.

BRIEF DESCRIPTION OF THE DRAWINGS

One or more arrangements of the present invention will now be described with reference to the drawings, in which:

FIG. 5 shows depictions of an example photograph for illustrating step 1002 of the method of FIG. 10;

FIG. 6 shown two depictions of another example photograph for illustrating step 1002 of the method of FIG. 10;

DETAILED DESCRIPTION INCLUDING BEST MODE

Figure 1A:
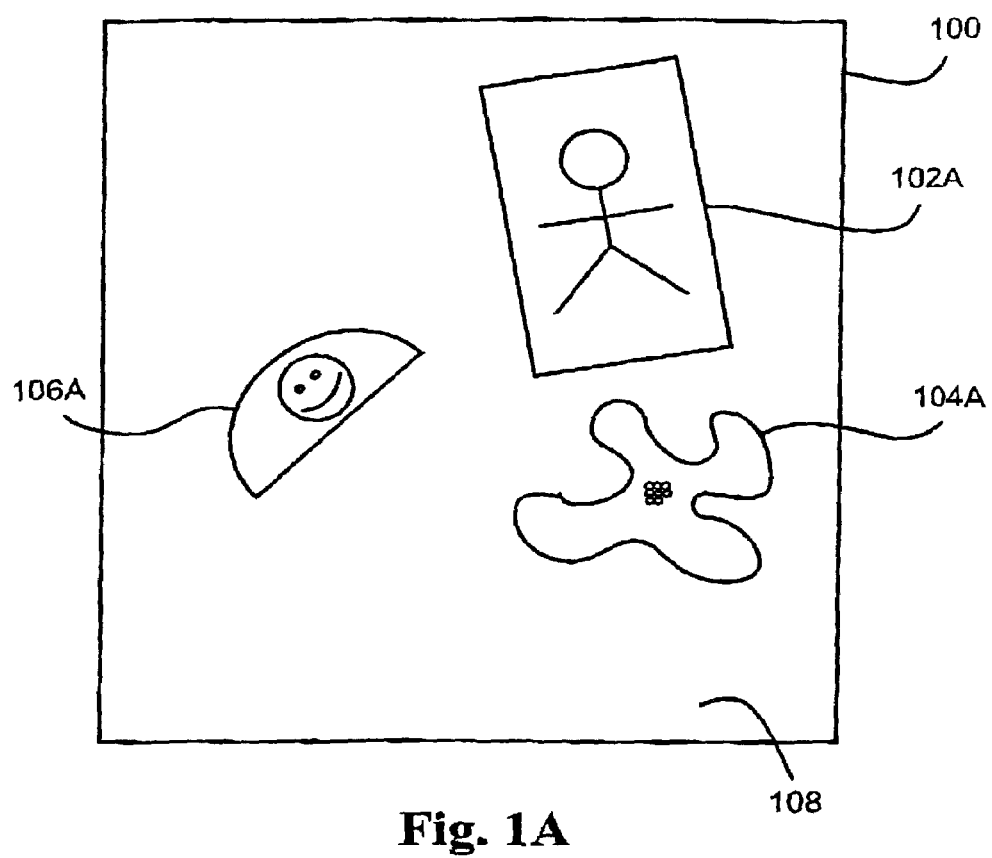
FIG. 1A shows a scanner platen of a scanner and three photographs placed on the scanner platen.

Where reference is made in any one or more of the accompanying drawings to steps and/or features, which have the same reference numerals, those steps and/or features have for the purposes of this description the same function (s) or operation(s), unless the contrary intention appears.

The principles of the arrangements described herein have general applicability to methods of scanning and individually detecting a number of images on a scanline basis. However, for ease of explanation, the steps of the method are described with reference to scanning a number of images on a scanner in conjunction with a general-purpose computer. However, it is not implied that the present invention be limited to the described methods. For example, the invention may have application to photocopies for photocopying multiple documents.

First Arrangement

The method in accordance with the first arrangement is preferably implemented as software operating on a general-purpose computer in conjunction with a scanner. The method in accordance with the first arrangement individually detects multiple photographs placed onto a scanner platen, corrects for any misalignment in the case where a photograph has been placed on the platen at an angle, and saves each photograph to disk. This is done in one pass of the scanner head, and uses a minimal amount of memory to achieve this. The method in accordance with the first arrangement can also detect photographs independently of the background colour of the scanner's lid. Preferably, the method is implemented solely as software in conjunction with the scanner, and does not require any specialised hardware.

Figure 1B:
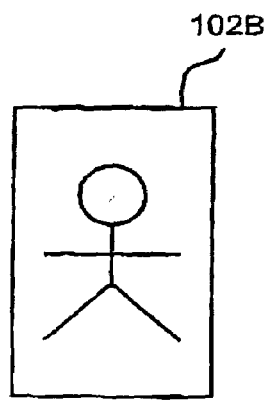
FIGS. 1B to 1D show depictions of three photographs contained in three respective image files generated by the method of FIG. 7 from the scanning of the three photographs of FIG. 1A.
Figure 1C:
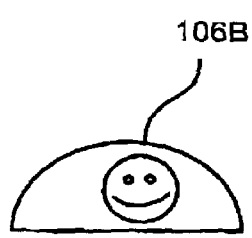
Figure 1D:
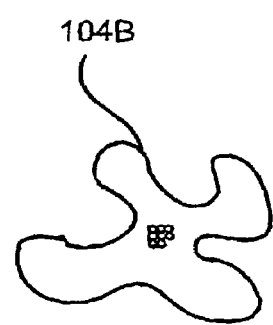
Figure 15:
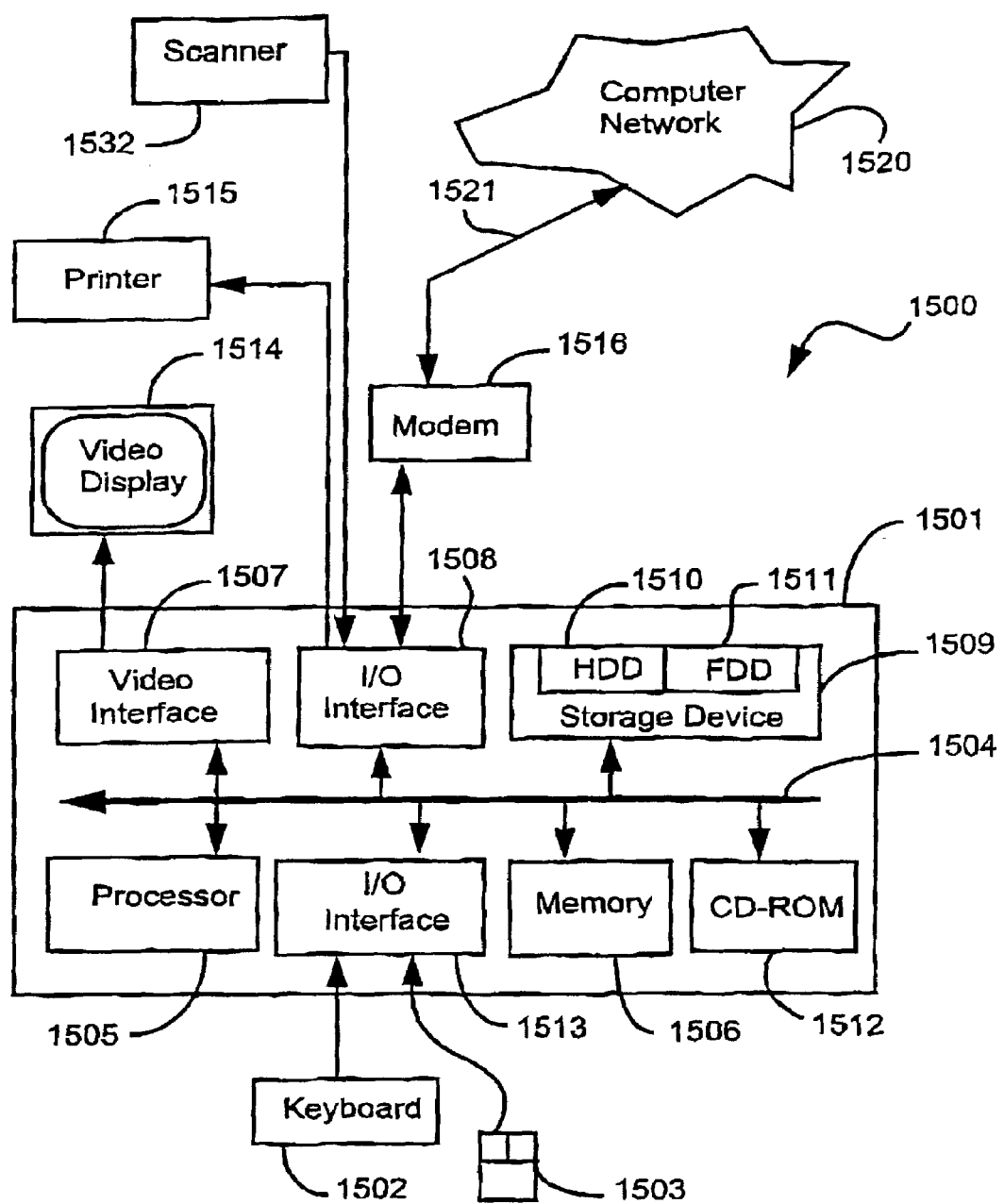
FIG. 15 is a schematic block diagram of a general-purpose computer upon which the arrangements described can be practiced.

Turning now to FIG. 1A, there is shown a scanner platen 100 of a scanner 1532 (FIG. 15) and three photographs 102A, 104A, and 106A placed on the scanner platen 100 for the purposes of illustration of the method 700 (FIG. 7) in accordance with the first arrangement. The scanner 1532 is coupled to a computer module 1505 in which the method 700 is implemented as software. The scanner 1532 and computer module 1501 form part of a computer system 1500, which will be described below in more detail. In operation, the scanner 1532 scans the entire platen 100 and the method 700 individually detects the three photographs 102A, 104A, and 106A from the background 108. The method individually rotates these three photographs to deskew them and saves them as separate image files 102B, 104B, and 106B, seen in FIGS. 1B to 1D, to the hard disk 1510. The present invention is described with reference to photographs, but is not to be limited thereto. The present invention is equally applicable to the scanning and individually detecting of any type of images such as photographs, printed documents, printed graphics, or any other type of images.

The method is preferably performed in two stages. The first stage occurs on a per-scanline basis, as the scanner head scans the platen. Each scanline is divided into portions that belong to the photographs on that particular scanline, and those portions are assigned to their respective photographs in a list of photographs maintained in memory. The second stage occurs on a per-photograph basis, as each photograph has been completely scanned. The photograph is rotated to "square", removed from the list of photographs in memory, and saved to disk.

The first stage of the method uses a threshold calculation to group neighbouring pixels on a current scanline with similar colours into groups. The method then performs a certainty calculation to determine the likelihood of the background colour of the scanner lid for the current scanline, and a threshold calculation to determine which portions of the current scanline are likely to belong to photographs and which belong to background. The method then determines which photographs in the photograph list that those portions of photographs on the current scanline belong to, and finally copies pixels into the list of photographs including extra pixels which compensates for possible errors in photograph detection.

The second stage of the method 700 occurs whenever a photograph in the photograph list is closed. A photograph in the photograph list is closed at a current scanline when no further pixel data on that scanline is found pertaining to the photograph, or when there are no more scanlines. The second stage comprises several steps. The first is an edge detection step to determine the edges of the photograph, which ones are straight and what angle they are rotated to. The next is a rotation step to rotate the photograph to "square". The next is a clipping step to remove unwanted edge artifacts. And the final step removes the result clipped photograph from the list and saves it to disk.

In some situations, the method 700 may incorrectly detect the edges of photographs where the photographs have similar colours around their edges to the background colour. The method 700 can compensate for some of these situations but not all of them.

Figure 7:
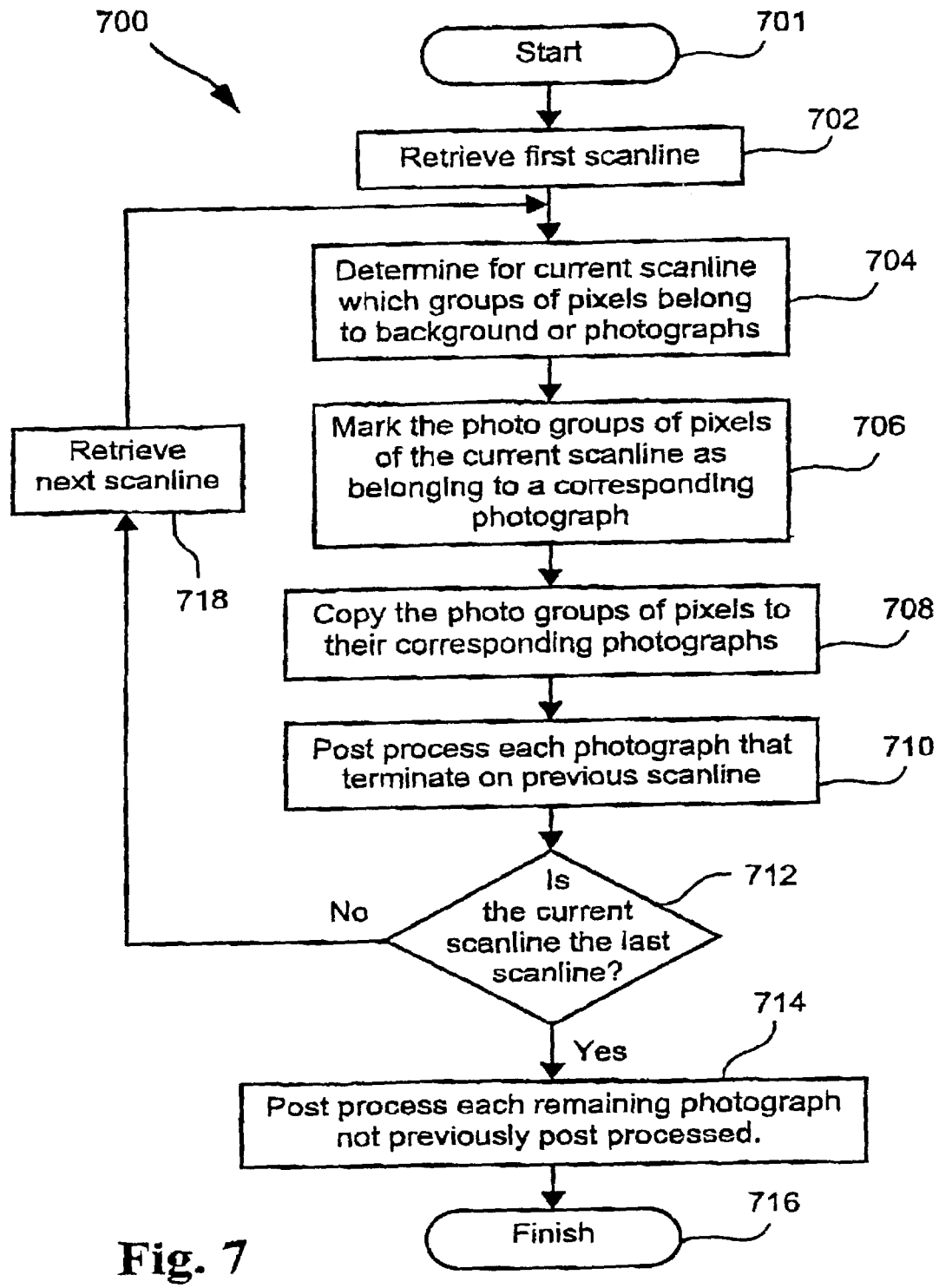
FIG. 7 shows a flow chart of a method of scanning and detecting a number of images on a scale basis in accordance with a first arrangement.

Turning now to FIG. 7, there is shown a flow chart of the method 700 of the scanning and individually detecting a number of images on a scanline basis in accordance with a first arrangement. The method 700 commences at step 701, where any necessary variables, such as variables bg_certainty and bg_colour are initialised.

The method 700 does not, initially, have any knowledge of the colour of the underside of the scanner lid. This knowledge is required, however, to distinguish between the pixel groups that belong to a photograph, and those that do not. The method 700 maintains and continually updates a value in a variable here entitled bg_colour that is representative of the current background colour in standard RGB format. This background colour stored in the variable bg_colour is representative of the colour of that portion of the underside of the scanner lid scanned by the scanner. The method also maintains and continually updates a value in a variable herein entitled bg_certainty that describes the certainty that the current background colour is correct, where 0.0 is completely uncertain, and 1.0 is totally certain. These values are continually updated and maintained across scanlines. Initially (before the first scanline) the method sets during commencement 701 the variable bg_certainty to zero and preferably the variable bg_colour to white.

After the commencement step 701, the method 700 starts retrieving 702 the first scanline of the platen image supplied by the scanner 1530 to the computer module 1501. Typically, scanners conduct a scan over the entire surface of the scanner platen and transfer this platen image in pixel raster order. The method preferably comprises a loop 704-712-718 for processing each scanline in turn of the platen image. For ease of explanation, this loop 704-712-718 will be described with reference to a current scanline, namely the currently retrieved scanline.

The method 700 during the first step of the loop 704-712-718 determines for the current scanline those groups of pixels that are likely to belong to photographs and those that are likely to belong to the background of the platen image. The latter being an image of the underside of the scanner lid.

Figure 8A:
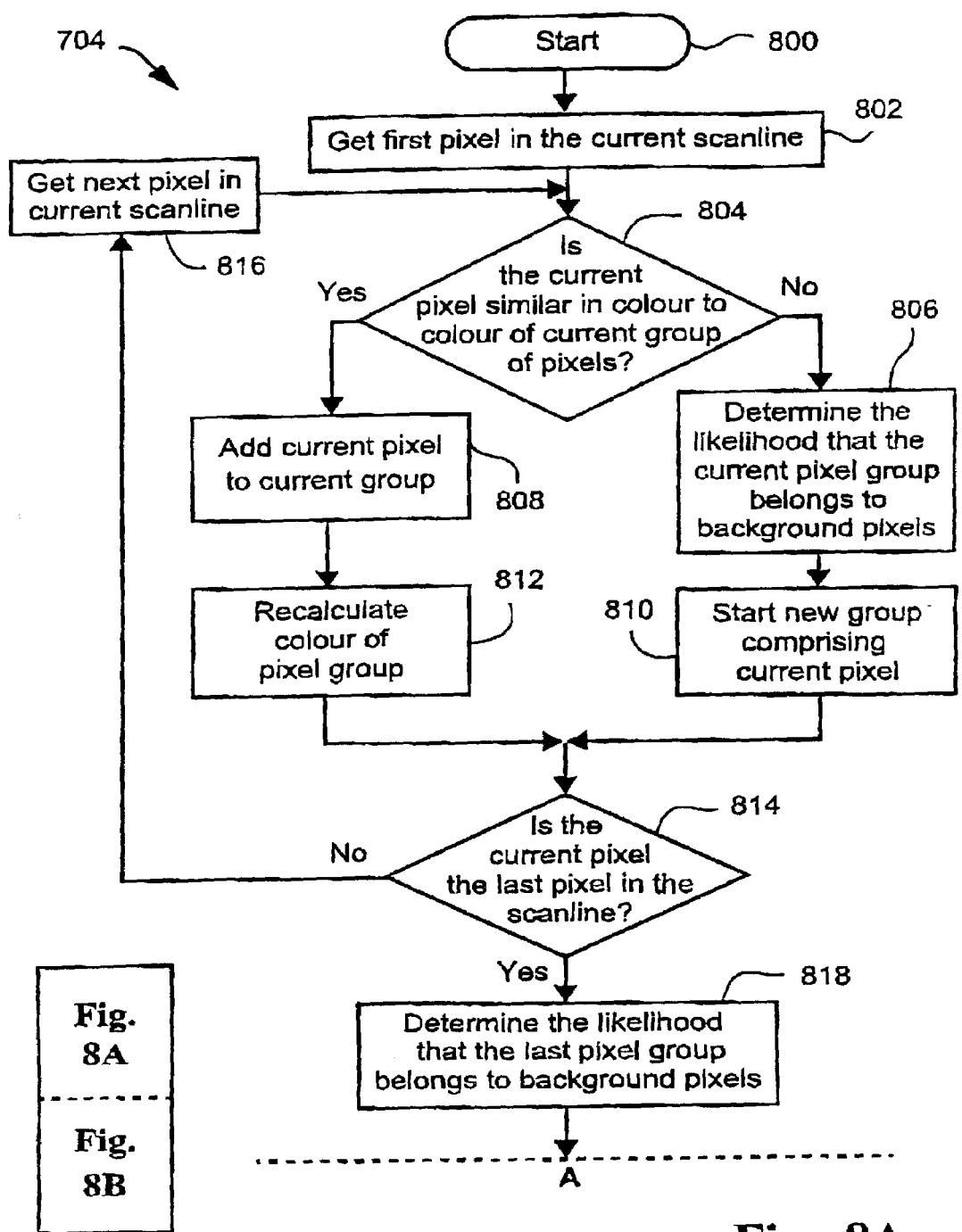
FIGS. 8A and 8B show a flow chart of step 704 of the method shown in FIG. 7 in more detail in accordance with the first arrangement.
Figure 8B:
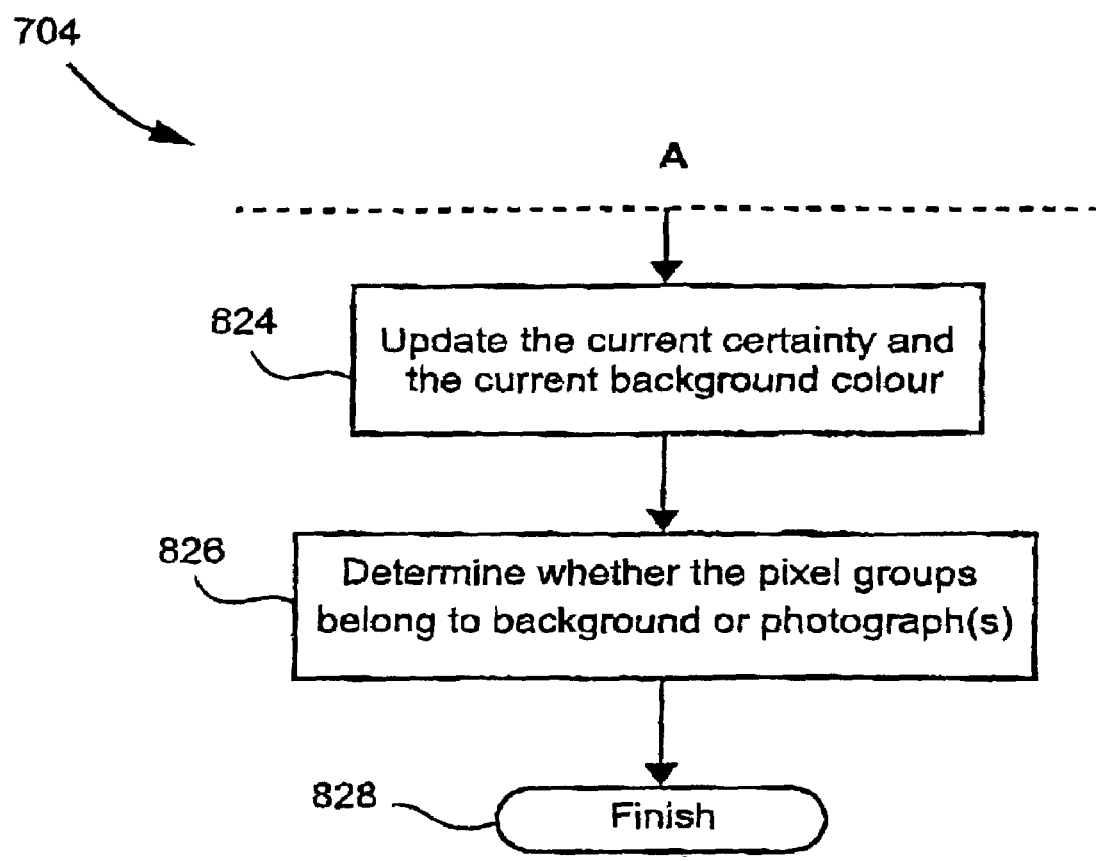
Figure 8B:
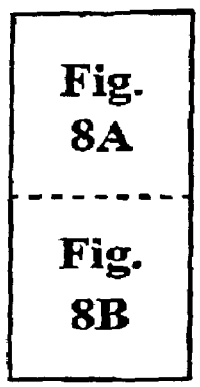

Turning now to FIGS. 8A and 8B there is shown a flow chart of step 704 in more detail. This step 704 commences at step 800 at the commencement of each new scanline of the platen image. The method 700 then retrieves 802 at step 802 the first pixel in the current scanline and proceeds to a loop 804-814-816 for processing each pixel in the current scanline in raster order. For ease of explanation this loop 804-814-816 will be described with reference to a current pixel namely the currently retrieved pixel.

The method 700 during the first step 804 of the loop 804-814-816 compares the colour of the current pixel to the colour of the current group of pixels. The method 700 during the processing of the current scanline generates and stores in memory a list of one or more groups of pixels. Also, the method 700 maintains and stores in memory the average colour of all pixels in a pixel group for each pixel group for the current scanline. Initially, the current group of pixels is empty and this comparison step 804 is bypassed [not shown] and the first pixel of the current scanline is added 808 to a first group. At other times, the current group of pixels comprises one or more consecutive pixels immediately preceding the current pixel. At these times, the comparison step 804 compares the colour of the current pixel to the colour of the current group of pixels. It does this by determining whether the colour of the current pixel is within a threshold limit of the colour of the previous adjacent pixel in the current scanline.

If the comparison step 804 reveals that current pixel is outside the threshold of colour similarity, the method 700 then determines at step 806, the likelihood of the current group of pixels (excluding the current pixel) being background pixels. This likelihood is a value, stored in a variable, that is representative of the likelihood of the current group of pixels being background pixels rather than pixels belonging to photographs. The manner in which this value is calculated will be described below in more detail. After the step 806, the method 700 then starts and stores 810 in memory a new group of pixels consisting only of the current pixel.

If, on the other hand the comparison step 804 reveals that the colour of the current pixel is within this threshold of colour similarity, the current pixel is added at step 808 to the current group of pixels. After the current pixel is added 808 to the current group of pixels, the method 700 then recalculates the average of the colour of the pixels in the current group and stores this in memory.

After completion of both step 812 or 810, the method 700 the checks at step 814 whether the current pixel is the last pixel in the current scanline. If the check 814 reveals that current pixel is not the last pixel in the current scanline, the method 700 then gets at step 816 the next pixel in the current scanline and returns to the comparison step 804 for the processing of this next pixel.

If on the other hand the check 814 reveals that the current pixel is the last pixel in the current scanline, the method 700 then determines at step 818, the likelihood of the last group of pixels being background pixels. This likelihood is a value, stored in the variable bg_likelihood, determined in like manner to that of step 806.

Figure 2:
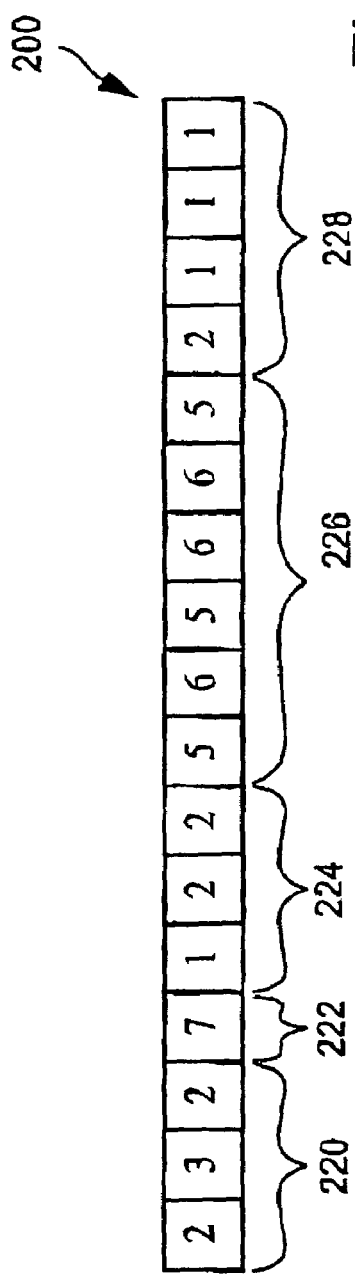
FIG. 2 shows an example portion of a scanline comprising a plurality of pixels for illustrating the grouping of the pixels according to steps 808 and 810 of the method of FIG. 8A.

Turning now to FIG. 2, there is shown an example portion of a scanline 200 comprising a plurality of pixels for illustrating the grouping of the pixels according to steps 808 and 810 of the method of FIG. 7. The method 700, compares 804 the current pixel with the immediately preceding pixel of the scanline 200 in turn. If the current pixel is within a threshold of similarity in colour to the previous (adjacent) pixel, the current pixel is added 808 to the group that the previous pixel belongs. If the current pixel is outside the threshold of similarity, a new group is started 810. If there is no previous pixel, a new group is also started consisting of only the current pixel.

Whilst, the method 700 is preferably implemented in the RGB colour space, FIG. 2 is described, for ease of explanation, with reference to pixels having a single colour component. The scanline 200 comprises a plurality of pixels each represented as a square and the values of the single colour component of the pixels are depicted therein. The method 700 groups together adjacent pixels of similar colour into groups of pixels 220, 222, 224, 226, 228. At a latter stage, the method 700 determines those groups that likely belong to photographs and those that likely belong to the background. The manner in which this is achieved will be described in detail below.

Figure 9:
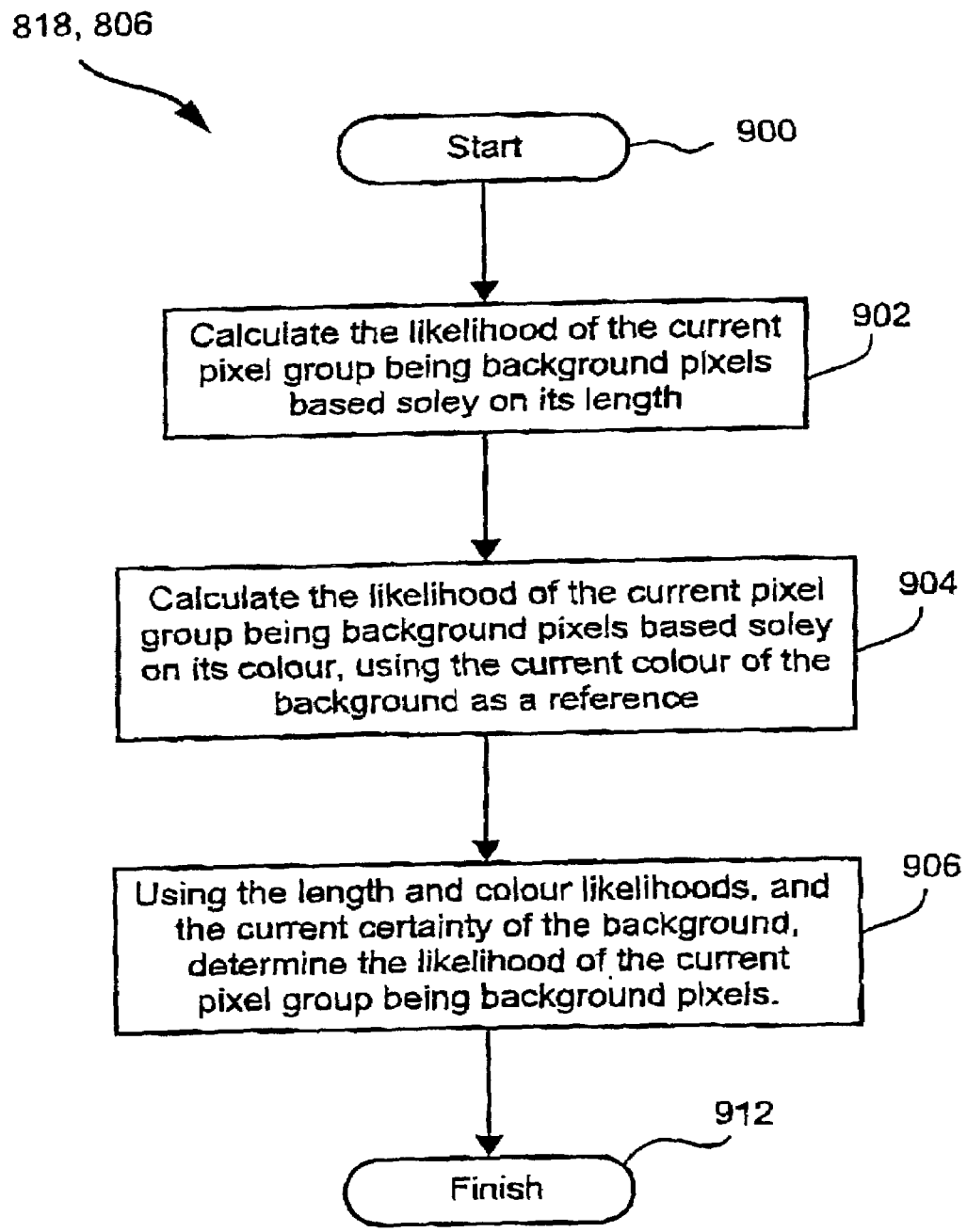
FIG. 9 shows a flow chart of the steps 806 and 818 of FIG. 8A in more detail in accordance with the first arrangement.

Turing now to FIG. 9, there is shown a flow chart of steps 806 and 818 of FIG. 8A in more detail. This flow chart shows the process for determining the likelihood value for a current group of pixels. This same process is called by both steps 806 and 818 of the method 700, step 806 calls this process for the current group of pixels in the current scanline, whereas step 818 calls this process for the last group of pixels in the current scanline. For ease of explanation, this process is described with reference to the current group of pixels only. Needless to say, the process performs the same operations on each group of pixels.

The process commences at step 900 where the current group of pixels is passed to the process. The process then calculates at step 902 the likelihood that the pixels of the current group are background pixels based solely on the length of the pixel group. Namely, the process determines a value representative of the likelihood that the pixels of the current group are an image of the underside of the scanner lid. Preferably, the process determines this likelihood in accordance with the following formulae:

$$\text{length\_likelihood} = x \quad \text{if } 0 <= x <= 1 \quad \quad \text{Eqn(1)}$$
$$= 1 \quad \text{if } x < 1$$

where $x = \text{length/threshold\_length}$ and where length is the number of pixels in the current group, and threshold_length is a constant, preferably equal to half the number of pixels on the scanline. In further variations of the method 700 other equations in place of Eqn(1) can be used that are a function of the number of pixels in the current group and whose result lies between 0.0 and 1.0.

After completion of step 902, the process then calculates at step 904 the likelihood that the pixels of the current group are background pixels based solely on the colour of the current pixel group, using the cutout colour of the background as a reference. Namely, the process determines a value representative of the likelihood that the average colour of the pixels of the current group is similar in colour to the current background colour currently stored in the variable bg_colour. Preferably, the process determines this likelihood in accordance with the following formulae:

$$\text{colour\_likelihood} = x \quad \text{if} \quad 0 <= x <= 1 \qquad \text{Eqn (2)}$$
$$= 0 \quad \text{if} \quad x < 0$$

where:

$$x = 1.0 - (\text{abs}(\text{average\_pixel.Red} - bg\_\text{colour.Red}) +$$
$$\text{abs}(\text{average\_pixel.Blue} - bg\_\text{colour.Blue}) +$$
$$\text{abs}(\text{average\_pixel.Green} - bg\_\text{colour.Green})) /$$
$$3 * bg\_\text{colour\_threshold}$$

and where:

average_pixel.Red, average_pixel.Green, and average_pixel.Blue are the values of the red, green, and blue colour components respectively of the average colour of the current group of pixels calculated during previous iteration of step 812;

bg_colour.Red, bg_colour.Green, and bg_colour.Blue are the values of the red, green, and blue colour components respectively of the background colour currently stored in the variable bg_colour, and bg_colour_threshold is a colour threshold constant preferably equal to 0.05.

Preferably, this bg_colour_threshold constant is set low as possible. However, if this constant is set too low noise can adversely effect the colour similarity determination. On the other hand, if it is set too high the method 700 doesn't reliably detect the edges of the photographs. A constant threshold value of 0.05 or 0.1 was found to be advantageous.

In further variation of the method 700 other equations in place of Eqn(2) can be used that are a function of the similarity between the colours of the current pixel group and the background colour currently stored in the variable bg_colour and whose result lies between 0.0 and 1.0.

After the completion of step 904, the process determines 906 a value representing the likelihood that the current group of pixels belong to background pixels, using both the colour and length likelihood values determined in steps 902 and 904. This likelihood herein called bg_likelihood is determined preferably in accordance with the following formulae:

$$bg\_\text{likelihood} = (bg\_\text{certainty} * \text{colour\_likelihood}) + \qquad \text{Eqn (3)}$$
$$(1.0 - bg\_\text{certainty} * \text{length\_likelihood})$$

where bg_certainty is the value currently stored in the variable bg_certainty, and the colour_likelihood and length_likelihood are values determined during the previous iterations of steps 904 and 902 for the current group of pixels.

After the completion of step 906, the process terminates 908 and the method 700 returns to the step 806 or 818 that called the process.

Returning now to FIGS. 8A and 8B, after the completion of step 818, the method 700 then updates 824 the values stored in the variable bg_colour and bg_certainty. During this step 824, the method 700 initially sets the variable bg_certainty to the maximum value of the bg_likelihood values determined during steps 806 and 818 for the current scanline. The method 700 then sets during this step 824 the variable bg_colour in accordance with the following formulae:

$$bg\_\text{colour} += (\text{max\_pixel\_group} - bg\_\text{colour}) * bg\_\text{certainty} \qquad \text{Eqn(4)}$$

where max_pixel_group is the average colour of the pixel group that has the maximum value of the bg_likelihood values for the current scanline, and bg_certainty is the updated bg_certainty value for the current scanline. The subtraction and addition operations on the colours max_pixel_group and bg_colour are performed by subtracting and adding the respective values of their colour components.

As mentioned above, the method 700 does not, initially, have any knowledge of the colour of the underside of the scanner lid. This knowledge is required, however, to distinguish between the pixel groups that likely belong to a photograph and those that do not. The method 700 maintains a value stored in the variable bg_colour that describes the current background colour in standard RGB format. The method 700 also maintains a value stored in a variable bg_certainty that describes the certainty that the current background colour is correct, where 0.0 is completely uncertain, and 1.0 is totally certain. These values are continually updated for each scanline. Initially (before the first scanline) the background certainty bg_certainty is zero and the background colour bg_colour is preferably white. The values in the variables bg_certainty and bg_colour an preferably updated in accordance with Eqns(1) to (4). These equations effectively update the variables bg_colour and bg_certainty in accordance with the following rules:

1. If the certainty is low, a long pixel group is likely to be the background colour, and so the current background colour is made more like the colour of the pixel group, and the certainty of that colour being correct is raised. A short pixel group will have little or no effect on the current background colour and certainty, regardless of its colour.

2. If the certainty is high, a long pixel group of a similar colour to the current background colour will again increase the certainty that the colour is correct, but a long pixel group of a different colour will decrease the certainty. Again, short pixel groups will have little or no effect on the current background colour and certainty, regardless of their colour.

Preferably, the method 700 implements these rules utilizing Eqns (1) to (4). In further variations of the method 700 other equations in place of Eqns (1) to (4) can be used to implement these rules.

The method 700 thus allows for subtle changes in the actual background colour of the scanner lid, and does away with the necessity for the method to have any prior information about the characteristics of the scanner.

After the completion of step 824, the method 700 then determines at step 826 whether the photographs of the current scanline are likely to belong to the background or to photographs. During this step 826, the average colour of the pixels in each pixel group on the current scanline is compared to the background colour currently stored in the variable bg_colour. If the average colour of the pixels of a pixel group is found to be similar to the background colour within a certain threshold, then that group is marked as being part of the background. If the color lie outside the threshold, that pixel group is marked as being part of a photograph. The method 700 preferably determines this similarity by summing the difference of the respective components of the average colour of a pixel group and the background colour and comparing it to a predetermined threshold value. Adjacent pixel groups that are both marked as background or both as photographs are also merged into the one pixel group.

Figure 3:
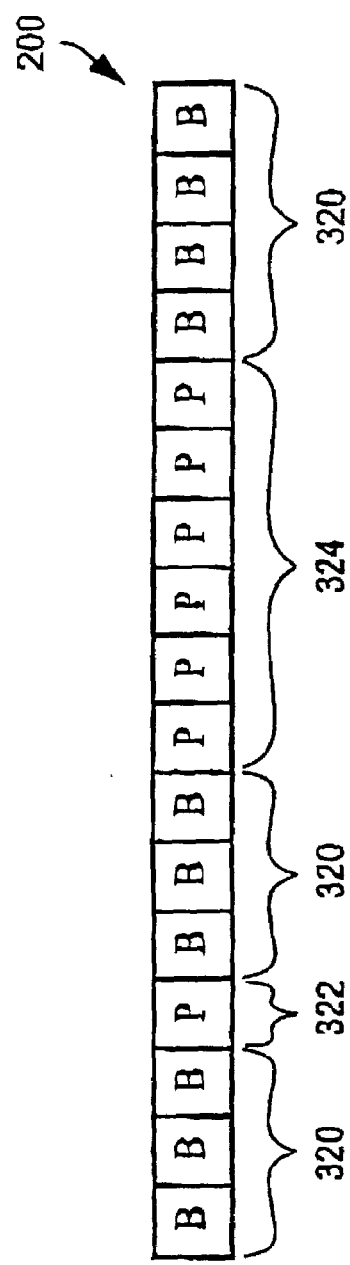
FIG. 3 shows an example portion of a scanline for illustrating the marking off the groups of pixels shown in FIG. 2 according to step 826 of the method of FIG. 8B.

Turning now to FIG. 3, there is shown an example portion of a scanline for illustrating the marking of the groups of pixels shown in FIG. 2 according to step 826 of the method of FIG. 7. The method during step 826 compares the average colour of the pixel groups 220, 222, 224, 226, and 228 against the background colour currently stored in the variable bg_colour. In this particular example, the method 700 determines during step 826 that the average colour of the groups 220, 224, and 228 are similar in colour to the background colour and marks these groups 220, 224, and 228 as being part of the background 320. The method 700 also determines during step 826 that the average colour of the groups 222 and 226 are not similar in colour to the background colour and marks these groups as being part of photographs 322 and 324.

Retuning now to FIG. 8B, after the completion of step 826 the step 704 terminates 828 and the method 700 proceeds to step 706. The method 700 keeps a list in memory of a list of previously detected and yet uncompleted photographs from previous scanlines. This photograph list comprises for each photograph the pixel data so far detected, and for each photograph the position of the leftmost edge and rightmost edge of the photograph at each previous scanline of the photograph. This list is maintained across scanline and is continually being updated for each scanline.

During step 706, the method 700 first compares the positions of the leftmost and rightmost edges of the groups of pixels of the current scanline that have been marked as being part of photographs against the positions of the leftmost and rightmost edges of the most recent previous scanline of the photographs in the list. As will become apparent this most recent previous scanline is that scanline immediately preceding the current scanline.

If this comparison reveals that a pixel group on the current scanline overlaps a pixel group on the previous scanline for a particular photograph, the current pixel group is marked as belonging to that photograph.

If this comparison reveals that a pixel group on the current scanline overlaps pixel groups from multiple photographs on the previous scanline, those multiple photographs are merged into one in the photograph list, and the current pixel group is marked as belonging to that newly merged photograph.

The step 706 then analyses all the pixel groups of the current scanline. If any pixel group of the current scanline is found to have pixel groups that have been marked as belonging to the same photograph on either side of it, the centre pixel group is also marked as belonging to the same photograph, regardless of whether is was previously marked as photograph or background. Furthermore, if any pixel group on the current scanline is found as having been marked as a photograph pixel group, but has yet to be marked as belonging to a particular photograph, that pixel group is marked as the start of a new photograph.

A completion of step 706, the method 700 proceeds to step 708 where those pixel groups marked as belonging to a particular photograph are copied to the corresponding photograph in the photograph list.

During step 708, all of the pixel groups on the current scale that have been marked as belonging to photographs on the photograph list have their original pixel values copied as new photograph scanline to their respective photographs on the list. Furthermore, the values for the positions of the leftmost edge and rightmost edges of the photographs for the current scanline are also copied to the list.

Preferably, step 708 also copies extra pixels in the current scanline on either side of the pixel group being copied into the same photograph in the list, to help counter for errors in the detection process. Such errors can occur if the colour along the edge of the photograph is very similar to the colour of the background. The step 708 determines the extent of the extra pixels to be copied by extrapolating straight edges detected from previous scanlines of the existing photograph.

If the step 708 determines that a straight edge on the left or right of an existing photograph on the list has already been detected on the immediately previous scanlines, that edge is extrapolated to the current scanline. The step 708 then copies extra pixels up to that extrapolated edge to the existing photograph in the list into the current photograph scanline. Information defining the extrapolated straight edges is also stored with the associated photograph in the list. As mentioned previously, the values for the positions of the leftmost and rightmost edges of the photographs for the current scanline are also copied to the list. These values define the leftmost and rightmost positions of the pixel group for the current scanline that we copied to a photograph in the photograph list excluding the pixels.

If the step 708 determines that a straight edge bas not yet been previously detected on immediately preceding scanlines, the step 708 subsequently analyses the photograph. The step 708 determines whether a straight edge has been previously detected on immediately preceding scanlines by referring to the information defining the straight edges (if any) associated with the immediately preceding scanlines of the existing photograph stored in the photograph list. If the step 708 determines there is no such straight edge information for the immediately preceding scanlines then step 708 determines if a predetermined number of photograph scanlines has already been collected, and if the end points of the left or right edges of the predetermined number of scanlines have a correlation coefficient that is greater than a predetermined threshold, that is, if they represent a straight edge. The step 708 then copies extra pixels up to that straight edge to the existing photograph in the list into current photograph scanline. The details of the left and/or right straight edges of the pixel group excluding the extra pixels are also stored with the associated photograph in the list.

Otherwise, if the step 708 detects that no straight is present, no extra pixels are copied to the list.

It is important to note during step 708 if a straight edge is detected on either the left or right side of the photograph, that the straight edge information is stored for future iterations, and the pixels up to the respective detected edges are copied to the current photograph scanline. Furthermore, the step 708 calculates the left and right edges of the photograph independently of each other.

Figure 4:
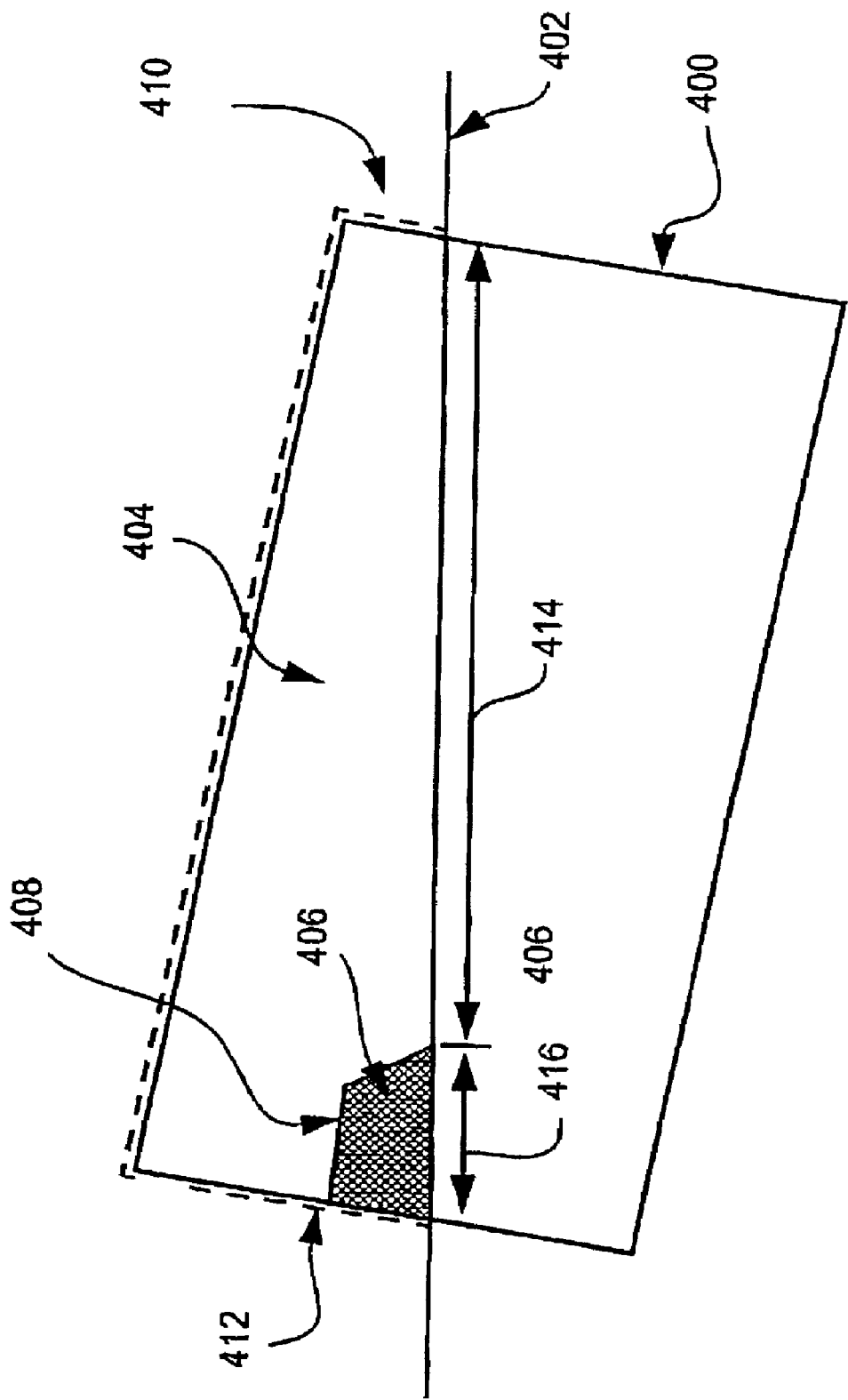
FIG. 4 shows an example document in the process of being scanned for illustrating step 708 of the method of FIG. 7.

Turning now to FIG. 4, there is shown an example document in the process of being scanned for illustrating step 708 of the method of FIG. 7. In this example, the scanner (not shown) has just completed the scanning of scanline 402. After completion of the scan 402, the method 700 mark 706 the group of pixels 414 as belonging to the uncompleted photograph 404 stored in the list. The method 700 during step 708 determines from the list that the photograph has straight edges 410, 412 associated with the immediately preceding scanlines. The method 700 during step 708 then extrapolates these straight edges 410, 412 to the current scanline 402 and determines that extra pixels 416 are to be copied to the photograph in the list for the current scanline. Finally, the step 708 copies these pixels 416, 414 to the photograph in the list for the current scanline. As can be seen, the method 700 has so far erroneously detected the edge of the rectangular document at edge 408. In order to counter this problem the method 700 copies 708 the extra pixels 406 to the photograph in the list. The extent of those extra pixels 416 to be copied for the current scanline is based on the assumption that the photograph is bounded by (or lies within) the predicted lines 410, 412. These extra pixels 416 now form part of the photograph in the list.

Returning now to FIG. 7, after completion of step 708, the method 700 proceeds to step 710. During this step 710, the list of photographs is then analysed to determine if any photographs were not modified by the current scanline. All such photographs in the list are marked as closed. The method 700 then commences during stop 710 a post processing stage for each photograph in the list that is marked as closed.

Figure 10:
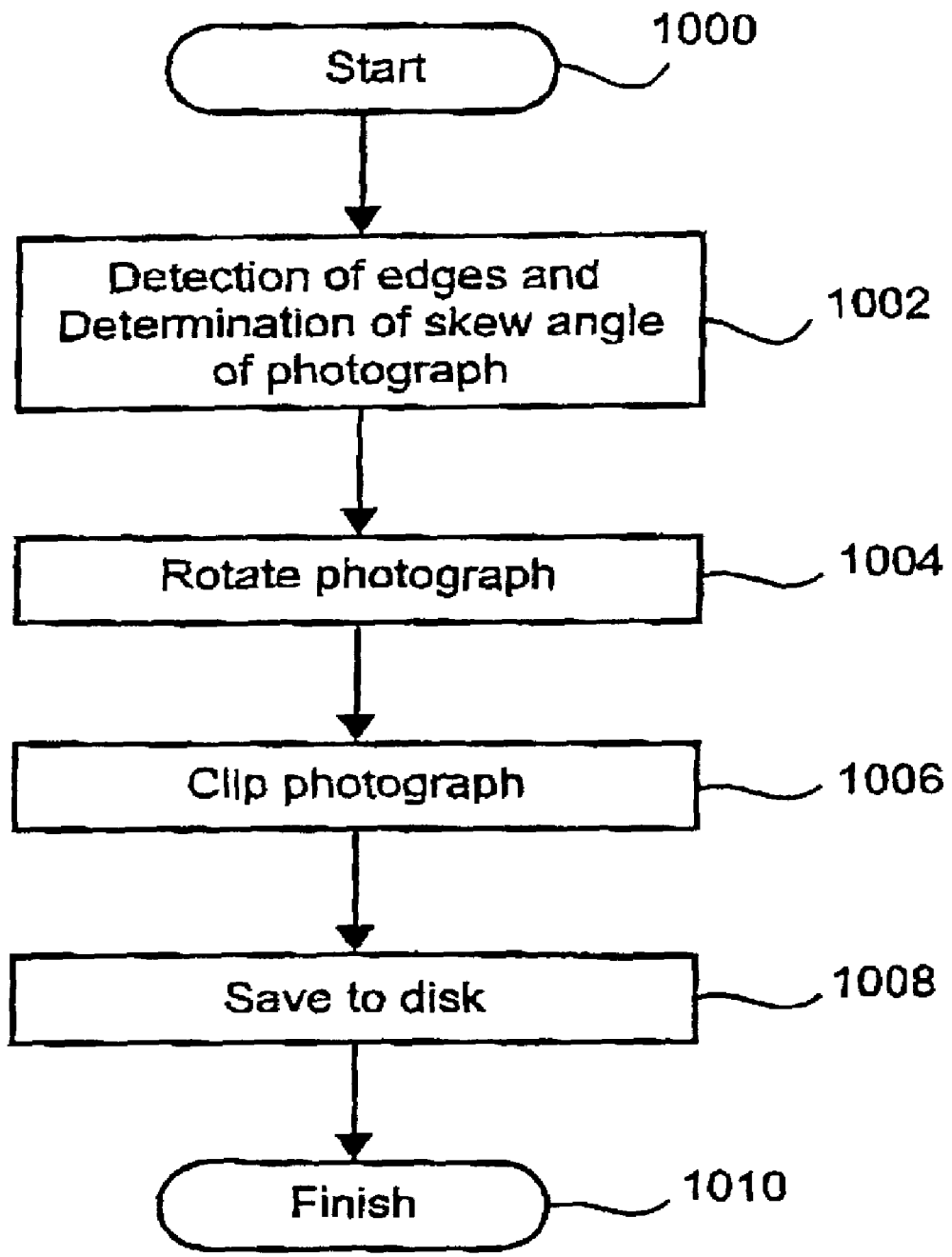
FIG. 10 shows a flow chart of the post-processing steps 710, and 714 of FIG. 7 in more detail in accordance with the first arrangement.

Turning now to FIG. 10, there is shown a flow chart of the post-processing steps 710 and 714 of FIG. 7 in more detail. This post-processing step commences at step 1000 and is performed on each of the closed photographs in the list in turn. The method 700 then proceeds to step 1002, where the method 700 determines the edges of the photograph, which ones are straight, and what angle they are rotated to. During this step 1002, the method 700 assumes that the photograph is a rotated rectangle and as such has a top corner, a bottom corner, a left corner and a right corner. The step 1002 initially determines the co-ordinates of these topmost, bottommost, leftmost, and rightmost points in the photograph from the information contained in the list. The method 700 determines the co-ordinates of these points based on the actually detected edges (e.g. 408) and not the predicted edges (e.g. 410, 412). Once the co-ordinates of these corners have been determined, the four steps between them are analysed to determine their correlation coefficients. For example, a number of points on the line connecting the topmost and leftmost points are analysed to determine their linear correlation coefficient. If the straightest edge (that is the edge with the largest correlation coefficient) has a correlation coefficient that is larger than or equal to a predetermined threshold value for straightness, the gradient of that edge is calculated. The gradient is then analysed to determine whether it is closer to the horizontal, or closer to the vertical. The angle that the straightest edge must be rotated in order to be equal to the horizontal or the vertical (whichever is closest) is then calculated, and that angle is retained as the skew angle. If the edge has a correlation coefficient that is less than the threshold value for straightness, the skew angle is set to zero and retained.

Turning now to FIG. 5, there is shown an example photograph for illustrating step 1002 of the method 700. FIG. 5 depicts a rotated rectangular photograph 1 which is representative of the information concerning one photograph contained in the photograph is list. The step 1002 determines the co-ordinates of these topmost 502, bottommost 504, leftmost 506, and rightmost 500 points in the photograph 1 from the information contained in the list. The step 1002 then determines the correlation coefficients for each set of points on each edge of the photograph. In this particular example, the step 1002 determines that the correlation coefficient of edge 510 is the greatest of the correlation coefficients of the four edges and is greater than the predetermined threshold for straightness. The step 1002 then calculates the gradient of the edge 510 and determines that the vertical axis is closest of the horizontal and vertical axes. The step 1002 finally calculates the angle θ the edge 510 makes with the vertical axes and sets the skew angle of this photograph to θ.

Turning now to FIG. 6, there is shown another example photograph for illustrating step 1002 of the method 700. FIG. 6 depicts an irregular photograph 2 which is representative of the information concerning one photograph contained in the photograph list. The step 1002 determines the co-ordinates of these topmost 552, bottommost 554, leftmost 556, and rightmost 550 points in the photograph 2 from the information contained in the list. The step 1002 then determines the correlation coefficients for each set of points on each edge of the photograph between these points. In this particular example, the step 1002 determines that the correlation coefficient of edge 580 and the remaining edges are less than the predetermined threshold for straightness. Consequently, the step 1002 sets the skew angle of this photograph 2 to zero.

Returning now to FIG. 10, the method 700 after determining 1002 the skew angle of the photograph then proceeds at step 1004 to rotate the photograph. During this step 1004, the skew angle determined during the previous stop 1002 is used to rotate the photograph data of the corresponding photograph in the list. This will bring the photograph to "square" with respect to the photograph scanlines.

After the rotation step 1004, the method 700 then clips the photographs at step 1006. It is important to note that detecting photographs via colour matching, as is done in the method 700, tends to produce a ragged edge on the detected photographs when used on real world data. The clipping step 1006 removes these ragged edges by clipping a predetermined number of pixels from each edge of the photograph.

After the photographs have been clipped 1006, the method 700 then removes them from the list and saves 1008 the resultant photographs to disk in separate image files. While the method 700 will detect photographs placed onto the scanner platen, it will also detect specks of dust, hair, smudges and other foreign material that nay be lying on the scanner platen. In an attempt to ignore these foreign objects, any photograph that is smaller than a predetermined threshold size is discarded. Any photographs that are larger than the threshold size will be saved to disk in a standard image format.

Preferably, the aforementioned rotation, clipping and saving to disk operations are combined into the one operation for the purposes of optimisation.

After the current closed photographs in the list have been removed from list and saved to disk, the step 710 terminates 1010. After the post-processing step 710, the method 700 checks whether the current scanline is the last scanline of the scanner. If the check reveals that the current scanline is not the last scanline, the method 700 then retrieves at step 719 the next scanline from the scanner and returns to step 704 for further processing. If the check reveals that the current scanline is the last scanline, the method 700 proceeds to step 714, where all remaining photographs in the list are closed. The method 700 then post-processes these remaining closed photographs in the manner described above in relation to FIG. 10. After the completion of the post-processing 714 of the remaining photographs, the method 700 is then terminated 716.

Second Arrangement

Figure 11:
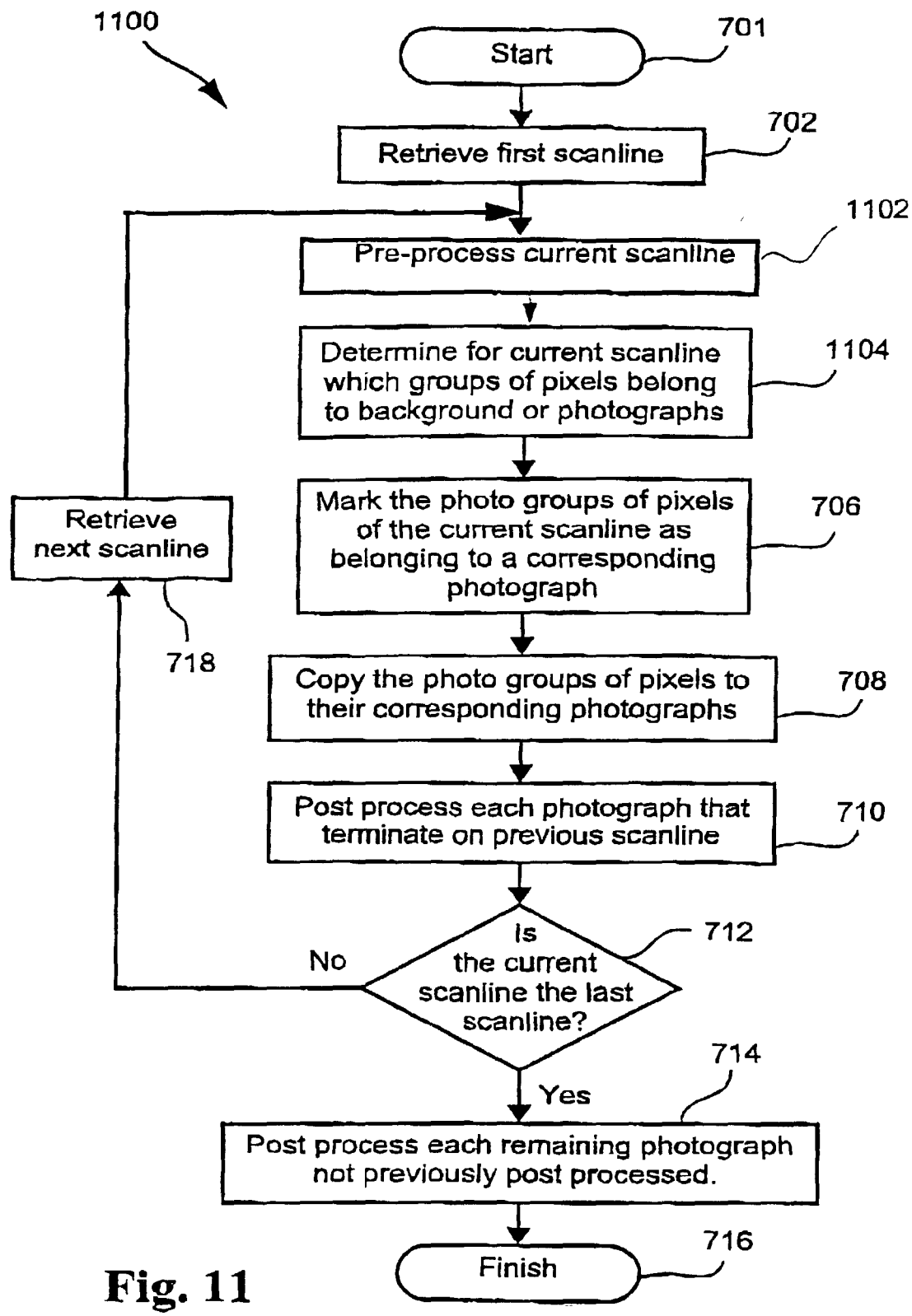
FIG. 11 shows a flow chart of a method of scanning and detecting a number of images on a scanline basis in accordance with a second arrangement.

Turning now to FIG. 11, there is shown a flow chart of a method of scanning and detecting a number of images on a scanline basis in accordance with a second arrangement. The method 1100 in accordance with the second arrangement is substantially similar to the method 700 shown in FIG. 7, with the exception that a pre-processing step 1102 is added, and the step 1104 of determining which groups of pixels belong to the background or photographs is implemented in a different manner to that of step 704 of FIG. 7. The remaining steps operate in the same manner as that described above with reference to the method 700 of FIG. 7 and will not be further described.

The pre-processing step 1102 generates a scanline of pixels representative of the edges of the currently retrieved scanline. This is achieved by comparing the colour of the pixels to the left of a current pixel with the color of those pixels to the right of the pixel, and comparing the color of those pixels above the current pixel with the color of those pixels below the current pixel. Specifically, each color component of the pixels of the generated scanline is calculated in accordance with, $$P_{i,j}^{edge} = \frac{1}{2L} \left\{ \left| \left( \sum_{k=1}^{k=L} P_{i-k,j}^{orig} \right) - \sum_{k=1}^{k=L} P_{i+k,j}^{orig} \right| + \left| \left( \sum_{k=1}^{k=L} P_{i,j-k}^{orig} \right) - \sum_{k=1}^{k=L} P_{i,j+k}^{orig} \right| \right\} \quad \text{Eqn (4)}$$

where $P_{i,j}^{orig}$ is a color component of the pixel of the currently retrieved scanline at the location i, j, $P_{i,j}^{edge}$ is the color component of the pixel of the pre-processed scanline of pixels at location i,j, and L is a comparison length preferably set to 12. This calculation is performed for each color channel of the currently retrieved scanline, and the result stored.

Figure 13A:
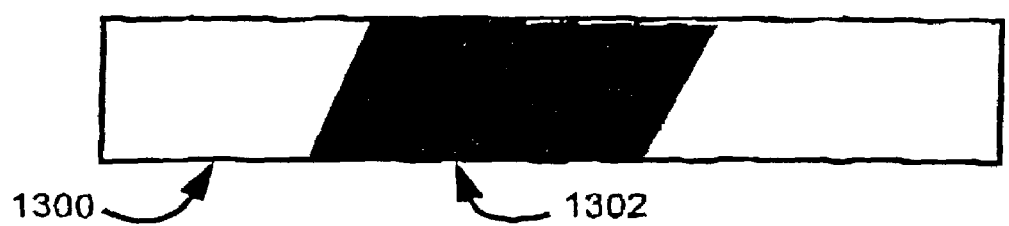
FIGS. 13A and 13B show an example portion of a scanline and a pre-processed scanline.
Figure 13B:
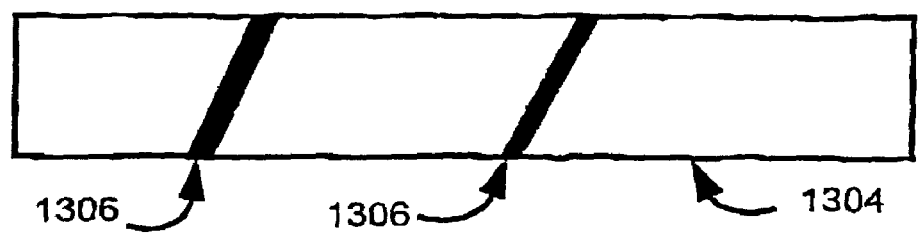

Turning now to FIGS. 13A and 13B, there is shown an example portion of a line and a corresponding portion of a scanline that has been pre-processed by step 1102. The portion of the original scanline 1300 illustrates a band 1302 comprising a number of non-zero pixels. The pre-processing step 1102 buffers the original scanline 1300 and performs the above mentioned calculation Eqn (4) on each pixel of the buffered scanline 1300 to produce a pre-processed scanline 1304. The resultant pre-processed scanline 1304 represents the edges 1306 of the original scanline, where the only non-zero pixels that remain are the edges of the band 1302.

Figure 12A:
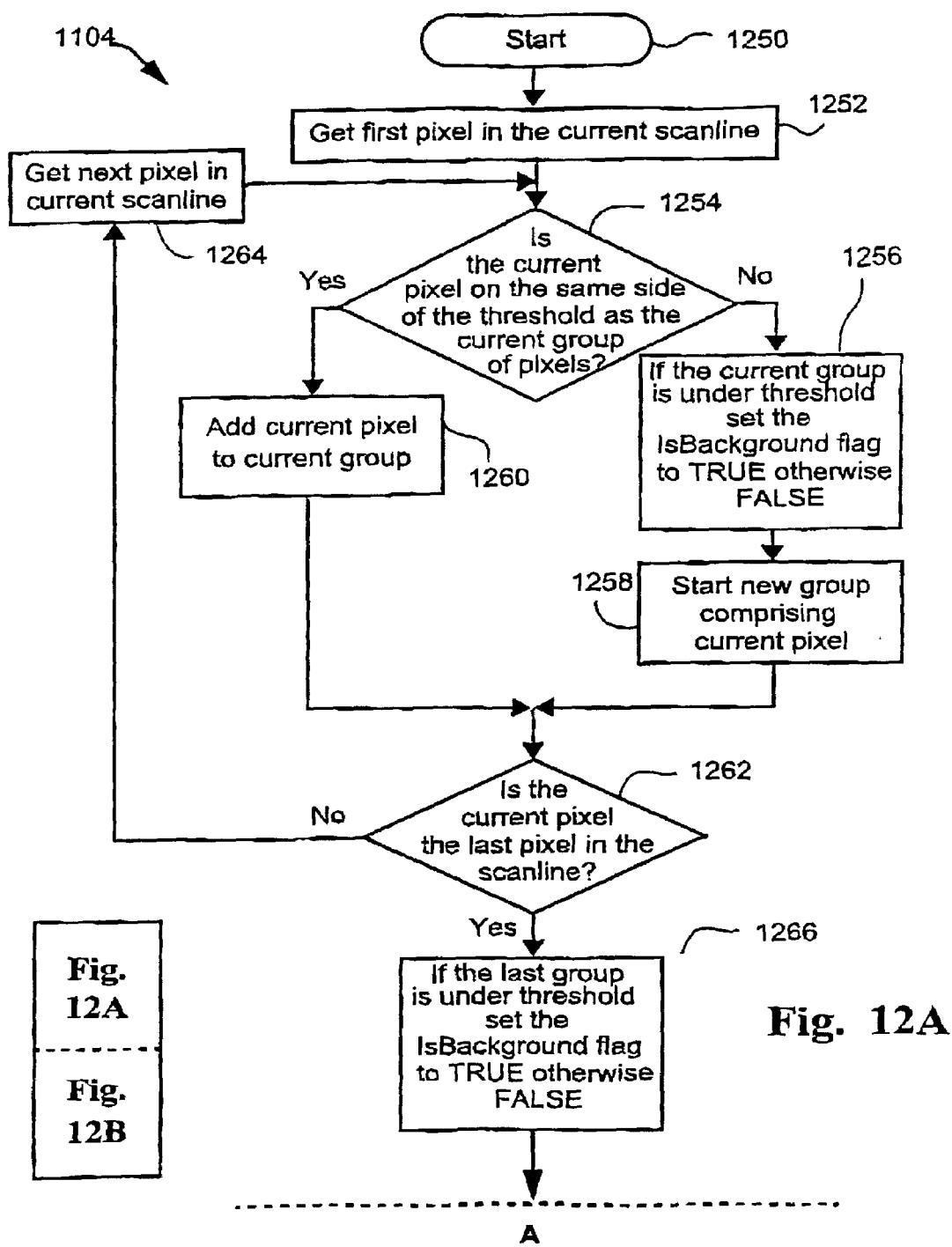
FIGS. 12A and 12B show a flow chart of step 1104 of the method shown in FIG. 11 in accordance with the second arrangement.
Figure 12B:
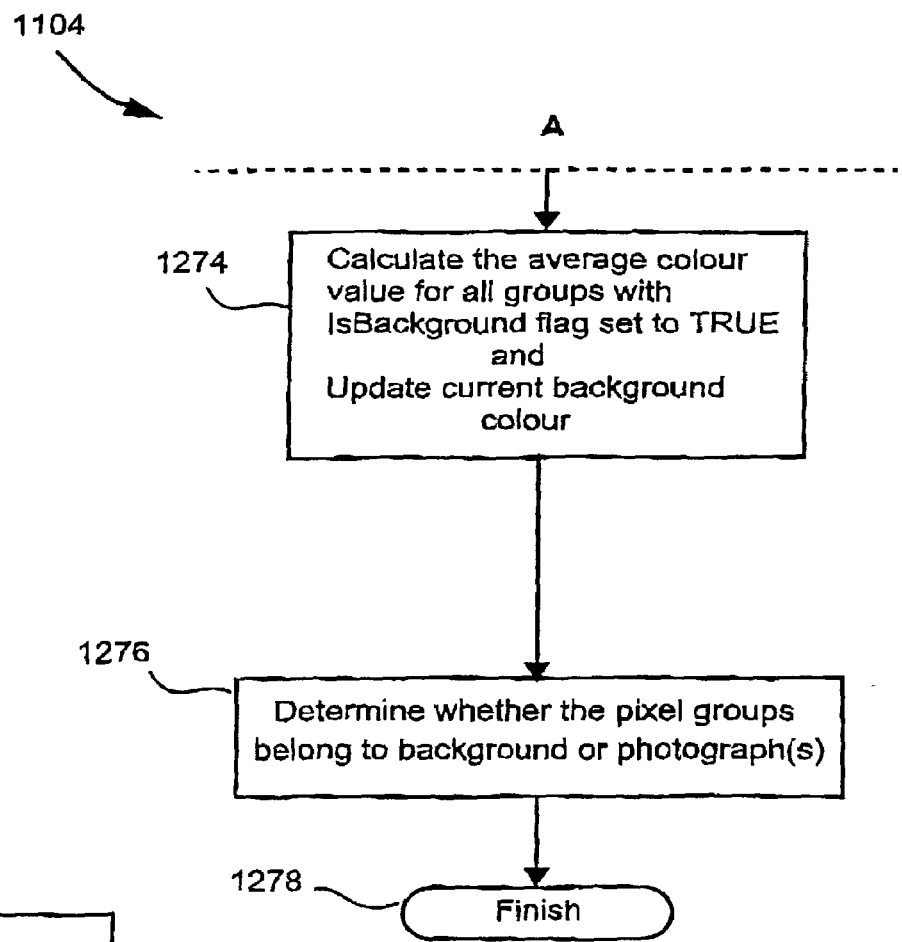

Turning now to FIGS. 12A and 12B, there is shown a flow chart of the determining step 1104 of the method shown in FIG. 11 in accordance with the second arrangement. This determining step 1104 differs from the determining step 700 (first arrangement) in that the step 1104 operates on the pre-processed scanlines rather than the original scanlines themselves. This step 1104 is in the form of a sub-routine, which is called for each pre-processed scanline of the platen image. The step 1104 commences at step 1250 at the commencement of each new pre-processed scanline of the platen image.

The step 1104 then retrieves at step 1252 the first pixel in the current pre-processed scanline and the proceeds to a loop 1254-1262-1264 for processing the pixels in the current pre-processed scanline in raster order. The loop 1254-1262-1264 processes the first pixel in the current pre-processed scanline during the first pass of the loop, and processes subsequent pixels in raster order during corresponding subsequent passes of the loop. For ease of explanation this loop 1254-1262-1264 will be described with reference to a currently retrieved pixel of a current pre-processed scanline during a corresponding pass of the loop.

The sub routine during the first step 1254 of the loop 1254-1261-1266 compares whether an intensity value of the current pixel of the current pre-processed scanline is on the same side of a predetermined threshold as the current group of pixels. The method 1100 during the processing of the current pre-processed scanline generates and stores in memory a list of one or more groups of pixels. Initially, the current group of pixels is empty and this comparison step 1254 is bypassed [not shown] and the first pixel of the current pre-processed scanline is added 1258 to a first group of pixels. At other times, the current group of pixels comprises one or more consecutive pixels immediately preceding the current pixel. At these times, the comparison step 1254 determines whether an intensity value of the current pixel of the current pre-processed scanline is under threshold or above threshold as compared to a predetermined threshold. In the case where multiple color channels exist, the threshold determination is made by combining the color channels. For example, where the pixels are in the RGB color space, the comparison step 1254 preferably determines whether the current pixel of the current pre-processed scanline is over or under threshold by performing the following:

Eqn (5)

```
If
(
    average_colour > colour_threshold
    OR
    ( | colour.red – average_colour| * 8) > colour_threshold
    OR
    ( | colour.green – average_colour| * 8) > colour_threshold
    OR
    ( | colour.blue – average_colour| * 8) > colour_threshold
)
    this pixel is over_threshold
else
    this pixel is under_threshold
```

The comparison step 1254 then determines whether the threshold result of the current pixel (i.e. over_threshold or under_threshold) is the same as the current group of pixels. If threshold result of the client pixel is on the same side as the cast group of pixels, then comparison step 1254 returns in the affirmative. Specifically if the the threshold result of the current pixel (e.g. over_threshold or under_threshold) is the same as the threshold results of the current group of pixels then the comparison step 1254 returns in the affirmative. Otherwise, if the threshold result of the current pixel is not the same as the threshold result of the current group of pixels, then the comparison step 1254 returns in the negative.

If the comparison step 1254 returns in the affirmative, the loop 1254-1262-1264 than proceeds to step 1260, where the current pixel of current pre-processed scanline is added to the current group of pixels.

Otherwise if the comparison step 1254 returns in the negative, the loop 1254-1262-1264 then proceeds to 1256, where a check is made as to whether the threshold of the current group is under threshold, that is equals under_threshold. If this test 1256 reveals that the threshold result of the current group of pixels is under told, then a flag IsBackground associated with the current group of pixels is set to TRUE, indicating that the current group of pixels belong to the background. Otherwise, if the threshold result of the current group of pixels is above threshold then the IsBackground flag associated with the current group of pixels is set to FALSE indicating that the current group of pixels belong to a photograph. After completion of step 1256, the loop 1254-1262-1264 proceeds to step 1258, where a new group of pixels is initialised comprising the current pixel of the current pre-processed scanline.

After the completion of both steps 1258 and 1260, the loop 1254-1262-1264 then checks at step 1262 whether the current pixel is the last pixel in the current pre-processed scanline. If the check 1262 reveals that the current pixel is not the last pixel in the current pre-processed scanline, the loop 1254-1262-1264 then gets at the next step 1264 the next pixel in the current pre-processed scanline and returns to the comparison step 1254 for processing of this next pixel.

If on the other hand, the check 1262 reveals that the current pixel is the last pixel in the current pre-processed scanline, then method 1100 proceeds to step 1266. The method 1100 during step 1266 sets the IsBackground flag to TRUE or FALSE for the current group of pixels in a similar fashion to step 1256. In this way, the method 1100 sets the IsBackground flag for the last pixel group in the current pre-processed scanline.

After completion of step 1266, the method 1100 proceeds to step 1274. The method 1100 dung step 1274 firstly computes a value avg_bg_colour representative of the average background colour of the current scanline. Preferably, this avg_bg_colour value is computed by averaging the color values of the pixels of all groups in the current scanline having the IsBackground flag set to TRUE. The averaging is performed on those original pixel values of the current scanline corresponding to those groups of pixels of the pre-processed current scanline having the IsBackground flag set to TRUE. The step 1274 the updates the current background colour of the scanner platen by updating the variable bg_colour in accordance with the following:

$$bg\_colour \mathrel{+}= (avg\_bg\_colour - bg\_colour) * e, \quad \text{Eqn(6)}$$

where e is a weighting that exponentially decays from 1.0 to approximately 0.0 over a predetermined number of scanlies from the initial scanline.

Preferably, the aforementioned predetermined number of scanlines is predefined such that it is equivalent to approximately the first 5 centimeters of the top of scanner platen. Preferably, the user is instructed to place the photographs some 5 centimeters from the top of the scanner platen, so that the method 1000 can establish a substantially correct value of bg_colour within the first 5 centimeters. It should be noted that the method 1100 differs from the previously described method 700 in that the background certainty, e.g. bg_certainty, is effectively equal to the exponential weight e.

After the completion of step 1274, the method 1100 then proceeds to step 1276, where the method determines those pixel groups that belong to the background or photograph(s). This step 1274 is performed in the same manner as previously described with reference to step 826 of the method 700 of the first arrangement. After step 1274, the sub-routine 1104 terminates and returns to the main method 1100, which then proceeds to the next stop 706.

In this way, the method 1100 is able to overcome problems associated with flecks, general nose, and shadows at the top and side of the scanner platen image. Flecks can occur in a platen image due to marks, scratches etc on the platen. The method 1100 generally disregards such flecks as the pre-processing step will generally remove such flecks and general noise. Typically, shadow is a result of the scanner lid not sitting completely flat because of the scanned object on the platen. The method 1100 generally will ignore areas of shadow because these areas generally have no edges. The present method 1100 performs pixel groupings based on data that emphasises edges and filters out noise. This reduces the effects of noise and flecks in the image, and will ignore areas of shadow because these areas generally have no edges. It will also emphasise the edge of photograph (s), even if the color difference is only subtle, because it still represents a clear edge.

Furthermore, the aforementioned threshold calculation Eqn (5) gives emphasis to colour difference in a single colour channel, so that a subtle pink or yellow is detected but more significant shadows are ignored. Also, the value of the colour threshold and the multiplier "8" are both experimentally chosen parameters, chosen to best detect edges and tolerate noise and artifacts in typical cases. In this case, each colour channel varies between 0 and 255 and the colour_threshold preferably used is 28.

The pre-processing step 1102 requires that a number of scanlines be stored in memory. Specifically, "comparison length" L scanlines ahead of the current scanline and "comparison length" L scanlines behind the current scanline nee to be buffered. Since the comparison length is preferably set 10 to 20 scanlines, for example L=12, and the entire height of a scanner platen is typically 4000 to 12000 scanlines, this buffer represents only a very tiny faction of the overall image.

It is important to note, that the pre-processed pixels are used only when creating pixel groups and determining whether a pixel group is a photo group or a background group. The pre-processed pixels are not used for determining background colour. In this case, the original pixels are used. Similarly, the pre-processed pixels are not extracted to form the photographs. Rather, the original pixels are retrieved to form the photographs. In this sense, the method 1100 groups together the pixels of the original current scanline corresponding to the groups of the pre-processed current scanline.

Figure 14:
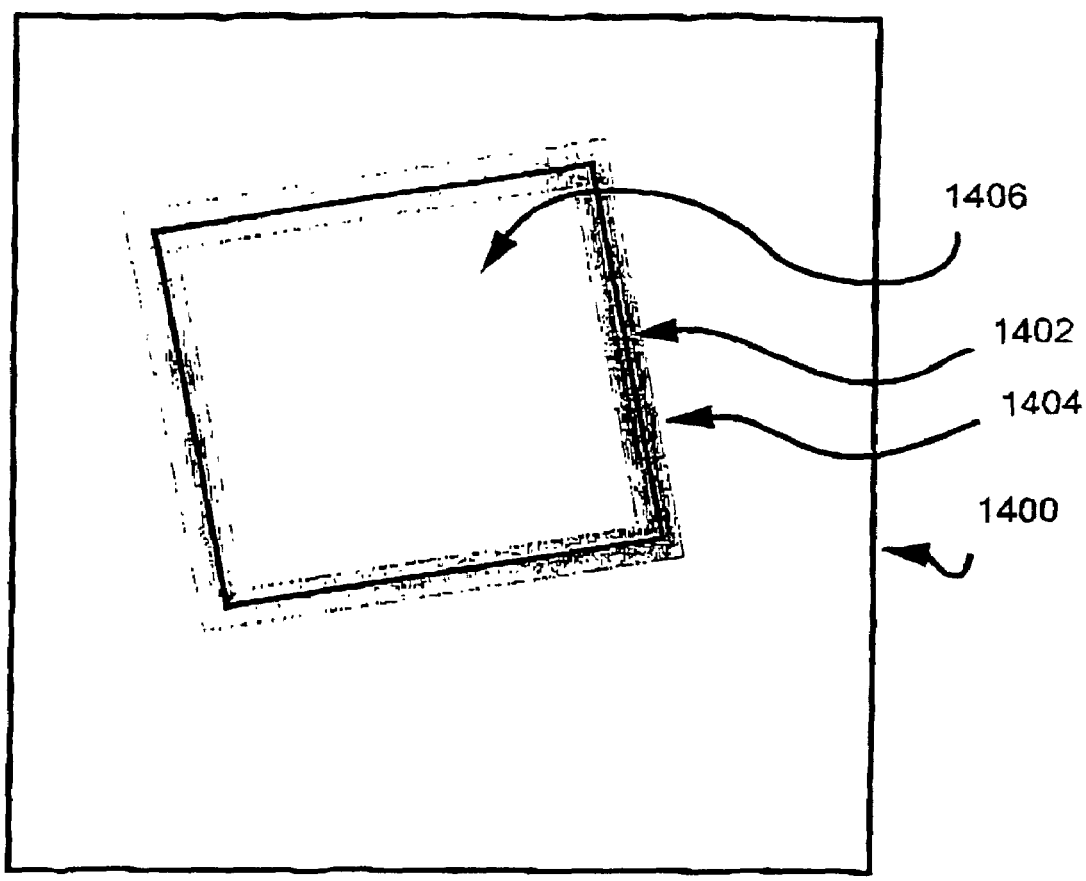
FIG. 14 shows an example of single, flat coloured rectangle lying on a scanner platen.

Turning now to FIG. 14, there is shown an example of a single, flat coloured rectangle lying on a scanner platen 1400 to explain how the method 1100 allocates pixels in the middle of a photograph as belonging to the photograph. A flat coloured rectangle is used for this example because it contains no internal edges (rare for an actual photo). The boundary of the rectangle is shown by the thick black line 1402. The shaded area 1404 is the area that will be over-_threshold for this scan after pre-processing is performed. The centre 1406 of this rile is not filled and is under_threshold and is marked by the method 1100 as background. This does not mean that the pixels within will not be saved in the extracted image. When step 708 copies groups of pixels, it copies them into the corresponding photograph. It also tracks the left and right edge of each photograph, and while the photograph continues, copies all pixels contained between those edges. What this means is that when the top edge of this rectangle is detected, step 708 will begin a new photograph as wide as the rectangle. All pixels between the left and right edge of the rectangle will be copied into the photograph. Step 708 will continue to copy all pixels between the left and right edges as long as it continues to detect actual photo groups which contact this top edge, namely the left and right detected edges of the rectangle. As long as the left and right edges are detected, the entire rectangle will be copied into the photograph. Since the left and right edges descend the entire length of the rectangle, the entire rectangle will be copied.

It should be noted that the pre-processing step will expand the boundary of the photograph very slightly. The number of pixels removed during the clipping step (1006) needs to account for this increase in boundary size.

The aforementioned method(s) comprise a particular control flow. There are many other variants of the method(s) which use different control flows without departing the spirit or scope of the invention. Furthermore one or more of the steps of the method(s) may be performed in parallel rather sequential.

Apparatus and Computer Program

The methods of scanning and detecting images is preferably practiced using a general-purpose computer system 1500, such as that shown in FIG. 10 wherein the processes of FIG. 7 or FIG. 11 may be implemented as software, such as an application program executing within the computer system 1500. In particular, the steps of the scanning and detecting method of FIG. 7 or FIG. 11 are effected by instructions in the software that are carried out by the computer. The instructions may be formed as one or more code modules, each for performing one or more particular tasks. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for scanning and detecting images.

The computer system 1500 comprises a computer module 1501, input devices such as a keyboard 1502 and mouse 1503, output devices including a printer 1515 and a display device 1514. A Modulator-Demodulator (Modem) transceiver device 1516 is used by the computer module 1501 for communicating to and from a communications network 1520, for example connectable via a telephone line 1521 or other functional medium. The modem 1516 can be used to obtain access to the Internet, and other network systems, such as a Local Area Network (LAN) or a Wide Area Network (WAN).

The computer module 1501 typically includes at least one processor unit 1505, a memory unit 1506, for example formed from semiconductor random access memory (RAM) and read only memory (ROM), input/output (I/O) interfaces including a video interface 1507, and an I/O interface 1514 for the keyboard 1502 and mouse 1503 and optionally a joystick (not illustrated), a scanner 1532, and an interface 1508 for the modem 1516. A storage device 1509 is provided and typically includes a hard disk drive 1510 and a floppy disk drive 1511. A magnetic tape drive (not illustrated) may also be used. A CD-ROM drive 1512 is typically provided as a non-volatile source of data. The components 1505 to 1514 of the computer module 1501, typically communicate via an interconnected bus 1504 and in a manner which results in a conventional mode of operation of the computer system 1500 known to those in the relevant art. Examples of computers on which the described arrangements can be practised include IBM-PC's and compatibles, Sun Sparcstations or alike computer systems evolved therefrom.

Typically, the application program is resident on the hard disk drive 1510 and read and controlled in its execution by the processor 1505. Intermediate storage of the program and any data fetched from the network 1520 may be accomplished using the semiconductor memory 1506, possibly in concert with the hard disk drive 1510. In some instances, the application program may be supplied to the user encoded on a CD-ROM or floppy disk and read via the corresponding drive 1512 or 1511, or alternatively may be read by the user from the network 1520 via the modem device 1516. Still further, the software can also be loaded into the computer system 1500 from other computer readable media. The term "computer readable medium" as used herein refers to any storage or transmission medium that participates in providing instructions and/or data to the computer system 1500 for execution and/or processing. Examples of stage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1501. Examples of transmission media include radio or infra-red transmission channels as well as a network connection to another computer or networked devices, and the Internet or Intranets including email transmissions and information recorded on websites and the like.

The methods of scanning and detecting images may alteratively be implemented in dedicated hardware such as one or more integrated circuits performing the functions or sub functions of the method. Such dedicated hardware may include graphic processors, digital signal processors, or one or more microprocessors and associated memories. This dedicated hardware may be implemented in the scanner itself.

INDUSTRIAL APPLICABILITY

It is apparent from the above that the arrangements described are applicable to the computer and graphics industries.

The foregoing describes only some embodiments of the present invention, and modifications and/or changes can be made thereto without departing from the scope and spirit of the invention, the embodiments being illustrative and not restrictive.

We claim:

1. A method of scanning and individually copying a number of images on a scanner, the method performing the following steps:

detecting and grouping together one or more consecutive pixels of a current scanline;

updating a current background color of the scanner, wherein the current background color is derived from a previous background color and a color representative of the grouped pixels of the current scanline most likely to be part of a background;

determining said groups of pixels of a current scanline that are likely to belong to said images and those that are likely to belong to the background based upon said updated current background color; and copying said determined groups of pixels belonging to images of a current scanline to their respective images.

2. A method as claimed in claim 1, wherein the representation of the current scanline represents edges of a pixel image of the current scanline.

3. A method as claimed in claim 1, wherein the representation of the current scanline represents a pixel image of the current scanline.

4. A method according to claim 1 wherein the pixels are grouped together based on a representation of said current scanline.

5. A method of scanning and individually copying a number of images on a scanner, the method performing the following steps:

detecting and grouping together one or more consecutive pixels of a current scanline having substantially similar colors;

updating a current background color having a likelihood of being a background color of the scanner, wherein the current background color is derived from previous background color and a color representative of pixels of the current scanline most likely to be part of a background color;

determining those said groups of pixels of a current scanline that are likely to belong to said images and those that are likely to belong to the background based upon said updated current background color; and copying said determined groups of pixels belonging to images of a current scanline to their respective images.

6. A method as claimed in claim 5, wherein said step of determining said groups of pixels comprises the sub-step of:

comparing said groups of pixels of said current scanline with said updated current background color, wherein if any one of said groups of pixels are substantially similar in color to the current background color marking those groups as belonging to said background otherwise marking any one of said groups of pixels that are not substantially similar in color to the current background color as belonging to said images.

7. A method as claimed in claim 5, wherein said step of updating the current background color comprises the sub-steps of:

determining a value representative of the current background color based on a value of the previous background color, a value representative of the certainty that said updated value of the current background color will be correct, and the color of that group of pixels of the current scanline most likely as being part of the background color.

8. A method as claimed in claim 5, wherein said step of updating the current background color comprises the sub-steps of (a) performing the following sub-steps for each of said group of pixels of the current scanline:
  (a)(1) determining a value representative of the likelihood that the group of pixels belongs to the background based on the number of pixels in the group;
  (a)(2) determining a value representative of the likelihood that the group of pixels belongs to the background based on the color of the pixels of the group with reference to the previously determined background color; and
  (a)(3) determining a value representative of the likelihood that the group of pixels belongs to the background based on the previous likelihood values determined during steps a(1) and a(2), and a value representative of the certainty that the previously determined background color is correct;

(b) performing the following sub-steps once for the current scanline:
  (b)(1) determining the maximum of the likelihood values determined by step a(3) for the groups of pixels for the current scanline;
  (b)(2) setting the certainty value to said maximum value determined during step (b)(1); and
  (b)(3) determining the current background color based on the color of the pixels of the group of pixels having a maximum likelihood value' determined by step (b)(1), the previously determined background color, and the certainty value set during step (b)(2);

and wherein said step of determining said groups of pixels comprises the sub-step of:

(c) comparing said groups of pixels of said current scanline with said determined current background color, wherein if any one of said groups of pixels are substantially similar in color to the current background color marking those groups as belonging to said background otherwise marking any one of said groups of pixels that are not substantially similar in color to the current background color as belonging to said images.

9. A method as claimed in claim 5, wherein said respective images are individually de-skewed, clipped and saved to disk as separate image files.

10. A method of scanning and individually copying a number of images on scanner, the method performing the following steps:

pre-processing a current scanline to provide a current pre-processed scanline wherein the current pre-processed scanline is representative of edges of a pixel image o the current scanline;

detecting and grouping together one or more consecutive pixels of the current pre-processed scanline, wherein those pixels of the current pre-processed scanline having values below a predetermined threshold value are grouped together in a group;

updating a current background color having a likelihood of being a background color of the scanner, wherein the current background color is derived from a previous background color and a color representative of a group of pixels of the current scanline corresponding to the grouped pixels of the current preprocessed scanline having values below the predetermined threshold;

determining said groups of pixels of a current scanline that are likely to belong to said images and those that are likely to belong to the background based upon said updated current background color; and copying said determined groups of pixels belonging to images of a current scanline to their respective images.

11. An image file produced by any one of the methods as claimed in claims 1, 5 or 10.

12. Apparatus for scanning and individually copying a number of images on a scanner, the apparatus comprising;

processing means for processing a plurality of scanlines, the processing means comprising:

means for detecting and grouping together one or more consecutive pixels of a current scanline;

means for updating a current background of the scanner, wherein the current background color is derived from a previous background color and a color representative of the grouped pixels of the current scanline most likely to be part of a background;

means for determining those said groups of pixels of a current scanline that are likely to belong to said images and those that are likely to belong to the background based upon said updated current background color; and means for copying said determined groups of pixels belonging to images of a current scanline to their respective images.

13. Apparatus as claimed in claim 12, wherein the representation of the current scanline represents the edges of a pixel image of the current scanline.

14. Apparatus as claimed in claim 12, wherein the representation of the current scanline represents a pixel image of the current scanline.

15. Apparatus for scanning and individually copying a number of images on a scanner, the apparatus comprising:

processing means for processing a plurality of scanlines, the processing means comprising:

means for updating and grouping together one or more consecutive pixels of a current scanline having substantially similar colors;

means for determining a current background color having a likelihood of being a background color of the scanner, wherein the current background color is derived from a previous background color and a color representative of the grouped pixels of the current scanline most likely to be part of a background color;

means for determining those said groups of pixels of a current scanline that are likely to belong to said images and those that are likely to belong to the background based upon said updated current background color; and means for copying said determined groups of pixels belonging to images of a current scanline to their respective images.

16. Apparatus as claimed in claim 15, wherein said means for determining said groups of pixels comprises:

means for comparing said groups of pixels of said current scanline with said updated current background color, wherein if any one of said groups of pixels are substantially similar in color to the current background color marking those groups as belonging to said background otherwise marking any one of said groups of pixels that are not substantially similar in color to the current background colour as belonging to said images.

17. Apparatus as claimed in claim 15, wherein said means for updating the current background color comprises:

means for determining a value representative of the current background color based on a value of the previous background color, a value representative of the certainty that said updated value of the current background will be correct, and the of that group of pixels of the current scanline most likely as being part of the background.

18. Apparatus as claimed in claim 15, wherein said means for determining the current background color comprises:

processing means for processing each of said group of pixels of the current scanline, the processing means comprising:

first determination means for determining a value representative of the likelihood that the group of pixels belongs to the background based on the number of pixels in the group;

second determination means for determining a value representative of the likelihood that the group of pixels belongs to the background based on the color of the pixels of the group with reference to the previously determined background color; and third determination means for determining a value representative of the likelihood that the group of pixels belongs to the background based on the previous likelihood values determined by said first and second means, and a value representative of the certainty that the previously determined background color is correct;

processing means for processing the current scanline, the processing means comprising:

fourth determination means for determining the maximum of the likelihood values determined by the third determination means for the groups of pixels for the current scanline;

means for setting the certainty value to said maximum value determined by said fourth determination means; and fifth determination means for determining the current background color based on the color of the pixels of the group of pixels having a maximum likelihood value determined by the fourth determination means, the previously determined background color, and the certainty value set by the setting means;

and wherein said means for determining said groups of pixels comprises:

means for comparing said groups of pixels of said current scanline with said determined current background color, wherein if any one of said groups of pixels are substantially similar in color to the current background color marking those groups as belonging to said background otherwise marking any one of said groups of pixels that are not substantially similar in color to the current background color as belonging to said images.

19. Apparatus as claimed in claim 15, wherein said respective images are individually de-skewed, clipped and saved to disk as separate image files.

20. Apparatus for scanning and individually copying a number of images on a scanner, the apparatus comprising:

processing means for processing a plurality of scanlines, the processing means comprising:

means for pre-processing a current scanline to provide a current preprocessed scanline, wherein the current preprocessed scanline is representative of edges of a pixel image of the current scanline;

means for detecting and grouping together one or more consecutive pixels of the current pre-processed scanline, wherein those pixels of the current preprocessed scanline having values below a predetermined threshold value are grouped together in a group;

means for updating a current background color having a likelihood of being a background color of the scanner, wherein the current background color is derived from a previous background color and a color representative of a group of pixels of the current scanline corresponding to the grouped pixels of the current pre-processed scanline having values below the predetermined threshold;

means for determining said groups of pixels of a current scanline that are likely to belong to said images and those that are likely to belong to the background based upon said updated current background color; and means for copying said determined groups of pixels belonging to images of a current scanline to their respective images.

21. A computer readable medium encoded with a computer program for scanning and individually detecting a number of images on a scanner, the computer program comprising:

processing means for processing a plurality of scanlines, the processing means comprising:

means for detecting and grouping together one or more consecutive pixels of a current scanline, wherein the pixels are grouped together based on a representation of said current scanline;

means for updating a current background color of the scanner, wherein the current background color is derived from a previous determined background color and a color representative of the grouped pixels of the current scanline most likely to be part of a background;

means for determining those said groups of pixels of a current scanline that are likely to belong to said images and those that are likely to belong to the background based upon said updated current background color; and means for copying said determined groups of pixels belonging to images of a current scanline to their respective images.

22. A computer readable medium encoded with a computer program for scanning and individually detecting a number of images on a scanner, the computer program comprising:

processing means for processing a plurality of scanlines, the processing means comprising:

means for detecting and grouping together one or more consecutive pixels of a current scanline having substantially similar colors;

means for updating a current background color having a likelihood of being a background color of the scanner, wherein the current background color is derived from a previous background color and a color representative of pixels of the current scanline most likely to be part of the background color;

means for determining said groups of pixels of a current scanline that are likely to belong to said images and those that are likely to belong to the background based upon said updated current background color; and means for copying said determined groups of pixels belonging to images of a current scanline to their respective images.

23. A computer readable medium encoded with a computer program for scanning and individually detecting a number of images on a scanner, the computer program comprising:

processing means for processing a plurality of scanlines, the processing means comprising:

means for pre-processing a current scanline to provide a current preprocessed scanline, wherein the current pre-processed scanline is representative of edges of a pixel image of the current scanline;

means for detecting and grouping together one or more consecutive pixels of the current pre-processed scanline, wherein those pixels of the current preprocessed scanline having values below a predetermined threshold value are grouped together in a group;

means for updating a current background color having a likelihood of being a background color of the scanner, wherein the current background color is derived from a previous background color and a color representative of pixels of the current scanline corresponding to the said group of pixels of the current pre-processed scanline having values below the predetermined threshold;

means for determining said groups of pixels of a current scanline that are likely to belong to said images and those that are likely to belong to the background based upon said updated current background color; and means for copying said determined groups of pixels belonging to images of a current scanline to their respective images.

* * * * *

UNITED STATES PATENT AND TRADEMARK OFFICE
CERTIFICATE OF CORRECTION

| | | |
|---|---|---|
| PATENT NO. | : 7,149,349 B2 | Page 1 of 4 |
| APPLICATION NO. | : 10/252522 | |
| DATED | : December 12, 2006 | |
| INVENTOR(S) | : Colin Eric Druitt et al. | |

It is certified that error appears in the above-identified patent and that said Letters Patent is hereby corrected as shown below:

ON TITLE PAGE AT (57) ABSTRACT

Line 1, "The" should read --There is--.

COLUMN 1

Line 26, "deters" should read --determines--; and
Line 38, "an" should read --and--.

COLUMN 3

Line 48, "sad" should read --said--.

COLUMN 4

Line 50, "off" should read --of--;
Line 55, "depictions" should read --two depictions--;
Line 57, "shown" should read --shows--; and
Line 60, "scale" should read --scanline--.

COLUMN 5

Line 2, "710," should read --710--;
Line 32, "implied" should read --intended--;
Line 34, "photocopies" should read --photocopiers--; and
Line 58, "module 1505" should read --module 1501--.

COLUMN 6

Line 40, "result" should read --resultant--.

COLUMN 7

Line 27, "pixel" (first occurrence) should read --pixel,--;
Line 58, "hand" should read --hand,--; and
Line 66, "the checks" should read --then checks--.

UNITED STATES PATENT AND TRADEMARK OFFICE
CERTIFICATE OF CORRECTION

PATENT NO. : 7,149,349 B2
APPLICATION NO. : 10/252522
DATED : December 12, 2006
INVENTOR(S) : Colin Eric Druitt et al.

It is certified that error appears in the above-identified patent and that said Letters Patent is hereby corrected as shown below:

COLUMN 8

Line 23, "Whilst," should read --While--;
    Line 59, "= 1 if < 1" should read --1 if x > 1--; and
    Line 61, "where x - lengh/threshold_lengh" should read --where x = length/threshold_length--.

COLUMN 9

Line 41, "effect" should read --affect--.

COLUMN 10

Line 6, "variable" should read --variables--; and
    Line 36, "an" should read --are--.

COLUMN 11

Line 35, "scanline" should read --scanlines--; and
    Line 66, "A" should read --After--.

COLUMN 12

Line 30, "we" should read --were--;
    Line 31, "pixels," should read --extra pixels.--; and
    Line 32, "bas" should read --has--.

COLUMN 13

Line 11, "problem" should read --problem,--; and
    Line 61, "is" should be deleted.

COLUMN 14

Line 43, "nay" should read --may--; and
    Line 58, "step 719" should read --step 718--.

UNITED STATES PATENT AND TRADEMARK OFFICE
CERTIFICATE OF CORRECTION

PATENT NO.      : 7,149,349 B2
APPLICATION NO. : 10/252522
DATED           : December 12, 2006
INVENTOR(S)     : Colin Eric Druitt et al.

It is certified that error appears in the above-identified patent and that said Letters Patent is hereby corrected as shown below:

COLUMN 15

Line 18, "the pixel," should read --the current pixel,--;
    Line 24, "Eqn (4)" should read --Eqn (5)--;
    Line 40, "line" should read --scanline--;
    Line 45, "Eqn (4)" should read --Eqn (5)--; and
    Line 63, "the proceeds" should read --then proceeds--.

COLUMN 16

Line 30, "Eqn (5)" should read --Eqn (6)--;
    Line 46, "cast" should read --current--;
    Line 47, "the the" should read --the--; and
    Line 56, "than" should read --then--.

COLUMN 17

Line 26, "dung" should read --during--;
    Line 35, "the updates" should read --then updates--;
    Line 38, "Eqn (6)" should read --Eqn (7)--;
    Line 41, "lies" should read --lines--; and
    Line 62, "nose," should read --noise,--.

COLUMN 18

Line 12, "Eqn (5)" should read --Eqn (6)--; and "difference" should read --differences--;
    Line 13, "detected" should read --detected,--;
    Line 15, "colour threshold" should read --colour_threshold--;
    Line 23, "nee" should read --need--; and
    Line 49, "rile" should read --rectangle--.

COLUMN 19

Line 7, "departing" should read --departing from--.

COLUMN 20

Line 21, "alteratively" should read --alternatively--.

UNITED STATES PATENT AND TRADEMARK OFFICE
CERTIFICATE OF CORRECTION

PATENT NO. : 7,149,349 B2
APPLICATION NO. : 10/252522
DATED : December 12, 2006
INVENTOR(S) : Colin Eric Druitt et al.

It is certified that error appears in the above-identified patent and that said Letters Patent is hereby corrected as shown below:

COLUMN 21

Line 6, "previous" should read --a previous--; and
    Line 65, "value'" should read --value--.

COLUMN 22

Line 15, "scanner," should read --a scanner,--;
    Line 20, "o" should read --of--; and
    Line 31, "preprocessed" should read --pre-processed--.

COLUMN 23

Line 28, "colour" should read --color--;
    Line 35, "the of" should read --the color of--;
    Line 49, close up right margin; and
    Line 50, increase the left margin.

Signed and Sealed this

Thirtieth Day of October, 2007

JON W. DUDAS
*Director of the United States Patent and Trademark Office*